United States Patent [19]

Herbert

[11] Patent Number: 5,333,183
[45] Date of Patent: Jul. 26, 1994

[54] UNIVERSAL MDR DATA RECORD COLLECTION AND REPORTING SYSTEM

[75] Inventor: James H. Herbert, Pittsford, N.Y.

[73] Assignee: Moscom Corporation, Pittsford, N.Y.

[21] Appl. No.: 851,553

[22] Filed: Mar. 13, 1992

[51] Int. Cl.$^5$ .......................................... H04M 15/00
[52] U.S. Cl. .................................... 379/112; 379/121; 379/126
[58] Field of Search ............... 379/112, 115, 116, 121, 379/134, 33, 34, 126

[56] References Cited

U.S. PATENT DOCUMENTS

| | | | |
|---|---|---|---|
| 3,651,269 | 3/1972 | Le Strat et al. | 179/7 R |
| 3,944,746 | 3/1976 | Burns et al. | 179/7.1 R |
| 4,165,447 | 8/1979 | Bertoglio et al. | 179/7.1 R |
| 4,464,543 | 8/1984 | Kline et al. | 179/8 R |
| 4,525,601 | 6/1985 | Barnich et al. | 179/7 MM |
| 4,625,308 | 11/1986 | Kim et al. | 370/104 |
| 4,656,656 | 4/1987 | Mundy, Jr. et al. | 379/113 |
| 4,723,270 | 2/1988 | Okamoto et al. | 379/113 |
| 4,788,718 | 11/1988 | McNabb et al. | 379/113 |
| 4,935,956 | 6/1990 | Hellwarth et al. | 379/112 |
| 4,979,207 | 12/1990 | Baum et al. | 379/112 |
| 5,008,929 | 4/1991 | Olsen et al. | 379/112 |
| 5,048,079 | 9/1991 | Harrington et al. | 379/112 |
| 5,103,475 | 4/1992 | Shuen | 379/112 |

OTHER PUBLICATIONS

Product/Service Information, BMC II and Deuce: DMS-100 Family SMDR Teleprocessing, Northern Telecom, Issue 1, Apr. 19, 1991.
UNC-533 UNIX ® Engine Product Description Sheet, Applied Computing Devices, Inc.

Primary Examiner—Stephen Chin
Assistant Examiner—Paul Loomis
Attorney, Agent, or Firm—Foley & Lardner

[57] ABSTRACT

An MDR data record collection and reporting system collects MDRs of various formats from PBX and telephone company Centrex switches of different types, for multiple customers. A set of switches is monitored by a monitor. The monitor includes one message processor connected to each switch, and an administrator processor, which is connected to all message processors for that set of switches. Each message processor captures MDRs from the switch to which it is connected. After the MDR has been captured, the message processor reformats the MDR from a format used on that type of switch into a selected format. The message processor also collects and sends statistics and alarms to the administrator processor. The administrator processor prepares statistical reports and alarm reports. Multiple monitors can be included within a telephone system. A collector is provided which can receive reformatted MDRs from one or more monitors, and can store reformatted MDRs for customers with sets of switches at multiple locations. A manager is provided which can receive reformatted MDRs from one or more monitors and one or more collectors. The manager and collector use the reformatted MDRs to prepare various reports.

38 Claims, 17 Drawing Sheets

AP DATAFLOW

UNIVERSAL MDR DATA RECORD COLLECTION AND REPORTING SYSTEM

BACKGROUND OF THE INVENTION

1. Field of the Invention

The invention relates to a data record collection and reporting system for use with PBX and telephone company switches, and, more particularly, to an MDR collection and reporting system which collects MDRs of various formats from switches of different types for multiple telephone company customers.

2. Discussion of the Related Art

Telephone company customers such as corporations, government agencies, and institutions often have multiple locations served by private telecommunications networks. Multiple telephone company customers are in a network served by a telephone company. Several telephone company central office switches are used to provide telephone service for a geographic area.

Many customers elect to provide telephone service within a location themselves, using a Private Branch Exchange (PBX), one form of an intelligent network node.

Others elect to have telephone service provided by their telephone company through a service called Centrex, another form of an intelligent network node. Centrex provides business services to many customers from each central office switch. The public network telecommunications provider (a telephone company) may provide Centrex service to multiple organizations from each central office switch.

A medium to large sized customer will typically have several locations, some served by Centrex and others served by PBX. Customers often have private telecommunications networks including the PBX or Centrex intelligent nodes, tie trunks that interconnect the nodes, and telephone stations.

Conventionally, each location will have telecommunications services provided by a switch. The switch can be either Centrex or PBX.

Demand for telecommunication services is constantly increasing, making it increasingly important for organizations to control their costs. The customer's need to control the costs associated with provider telecommunications has introduced the requirement of collecting detailed information on the usage of the network.

As a result, the intelligent nodes have the ability to record information about each call in the form of a Message Detail Record (MDR). These records are used by corporations to determine the cost of each call. The records can also be used for other purposes, such as detection of fraudulent calls. Thus, various information is encoded into the MDR.

Many different types of intelligent nodes and telephone switches are available on the market to serve different needs of customers. Unfortunately, each type of node and switch provides the information about each call in a different format. There exists a profusion of different MDR formats, all used within a telephone network.

The public network telecommunications provider has multiple switches. Certain large customers may use multiple central office switches. Because the public network telecommunications provider provides Centrex to multiple organizations from multiple central office switches, it needs to be able to collect usage information for multiple customers on each of the multiple switches. Further, it needs to collect each MDR separately for each customer.

There further exists a need for the public network telecommunications provider to deliver usage information to each customer reliably and rapidly.

The organization's need to control the costs associated with provider telecommunications has introduced the requirement of collecting detailed information on the usage of the private telecommunications network. Thus, there exists a need for the customer to be able to further process the usage information to provide administrative, planning and maintenance functions regarding the customer's network.

To enable rapid delivery of usage information, electronic transmission is preferred to mailed paper documentation. Furthermore, an ideal system would be prepared to transmit all of a customer's MDRs and usage information in one electronic transmission session.

Therefore, there is a need for a universal MDR system which works with the different formats and delivery mechanisms.

Conventional systems lack these features. For example, one conventional system is shown in U.S. Pat. No. 4,656,656, issued Apr. 7, 1987, to Mundy, Jr. et al. In Mundy, a hospital call accounting system is described that collects MDRs, which Mundy calls CDRs. The MDRs, however, are collected from a single PBX system. Thus, Mundy has multiple disadvantages in that it works only with a single customer, is limited to PBX, and is limited to a single switch.

Another conventional system is shown in U.S. Pat. No. 4,464,543, issued Aug. 7, 1984, to Kline et al. Kline discloses a call trace facility built into a network control center for a private branch exchange. Multiple MDRs are collected from multiple switches. Unfortunately, Kline is limited to use with PBX switches, and cannot be used with Centrex. Furthermore, Kline uses the MDRs primarily to trace calls. Thus, Kline does not provide other information in the MDR in a format useful for network administrative, planning and maintenance functions. A further drawback of Kline is that Kline does not deal with multiple customers.

Another example of a conventional system is shown in U.S. Pat. No. 4,525,601, issued Jun. 25, 1985, to Barnich et al. Barnich discloses a system for efficient costing of telephone calls, by collecting MDRs, which Barnich calls SMDRs, from a PBX. Unfortunately, Barnich does not deal with multiple switches, Centrex, or multiple customers.

Yet another conventional system is shown in U.S. Pat. No. 5,048,079, issued Sep. 10, 1991, to Harrington, et al. Harrington discloses enhancing the accuracy of call duration information in an MDR, which Harrington calls SMDRs, by inserting an apparatus into a trunk of a PBX. The apparatus collects MDRs from the PBX and outputs them with enhanced call duration accuracy. However, Harrington does not deal with multiple switches, Centrex, or multiple customers.

Finally, U.S. Pat. No. 4,788,718, issued Nov. 29, 1988, to McNabb, et al. that essentially generates MDRs by monitoring certain messages, called SS7 messages. McNabb can function with multiple customers, however, McNabb has the distinct disadvantage that it does not use MDRs generated by PBX or Centrex.

American Computer and Electronics is reported to have a data acquisition product that accepts data from AMA or MDR ports or multiple central office switches. This product is a passive VME-based receptor that lacks any processing capability. It is designed to transmit data solely to a telephone company billing system. It does not support direct customer access. It does not do any real time evaluation of record format or data integrity and it does not perform call rating.

Telesciences produces a passive product that emulates a tape drive and collects AMA data and transmits it to some telco provided billing or collection system. They have produced an adjunct to that system designed to allow the parcing of that data flow to create an MDR like record from the AMA data stream. This product does not produce a Bellcore standard MDR record. It does not contain call records for anything other than billable calls. It does no real time accuracy or integrity checking, and it does not conform to any open architecture standards.

AT&T produces three products that provide SMDR information to customers; the ACP, BCP and an MDR Translator that provide SMDR to premise directly from the central office switch to a single customer only. The ACP and BCP are mini computer architectured systems that are not built to reside within a central office, are intended to support more than one central office, do not do any edit checking of call records, do not produce call records that conform to any standard, are not integrated into a call record delivery system for the end user customer, and do not fit into a Collector system architecture.

Northern Telecom produces several products that perform some of the tasks contained within the INFO/MDR system functionality. These products are the DNC 50 and DNC 500, the BMC II, and the Deuce. The DNC 50 and DNC 500 are functionally equivalent to the AT&T BCP and ACP products. The BCP is a product designed to reside within a central office. It does no data validation or error checking of the data stream from the switch. It does no protocol or data translation and it supports only a single customer from the switch. The Deuce is a similar product that supports two customers rather than one. Of these products, only the DNC 50 and DNC 500 support switches produced by vendors other than Northern Telecom.

SUMMARY OF THE INVENTION

An object of the invention is to provide an MDR data record collection and reporting system which can be used with both PBX and Centrex switches of all types.

It is a further object of the invention to provide a system which can be used with multiple switches.

It is another object of the invention to provide a system which can be used with multiple customers.

The universal MDR data record collection and reporting system receives an MDR in one of a plurality of MDR formats from one of a plurality of types of switches on a telephone network. It reformats the MDR to one of a plurality of selected formats. It also stores the reformatted MDR in an MDR file. Further, it also transmits the reformatted MDRs from the message processor using a communications protocol.

BRIEF DESCRIPTION OF THE DRAWINGS

An exemplary embodiment of the invention is illustrated in the drawings and described in detail below.

In the drawings.

DETAILED DESCRIPTION OF THE PREFERRED EMBODIMENTS

A universal MDR data record collection and reporting system for use with Centrex switches or capture devices used with PBXs on a telephone network includes a message processor with a receiver, receiving an MDR in one of a plurality of MDR formats from one of a plurality of types of switches on a telephone network. The message processor also has a reformatter, reformatting the MDR to one of a plurality of selected formats. Additionally, the message processor has a means for storing the reformatted MDR in an MDR file. Further, the message processor also has a transmitter, transmitting the reformatted MDRs from the message processor on a communications link using a communications protocol.

Figure 1:
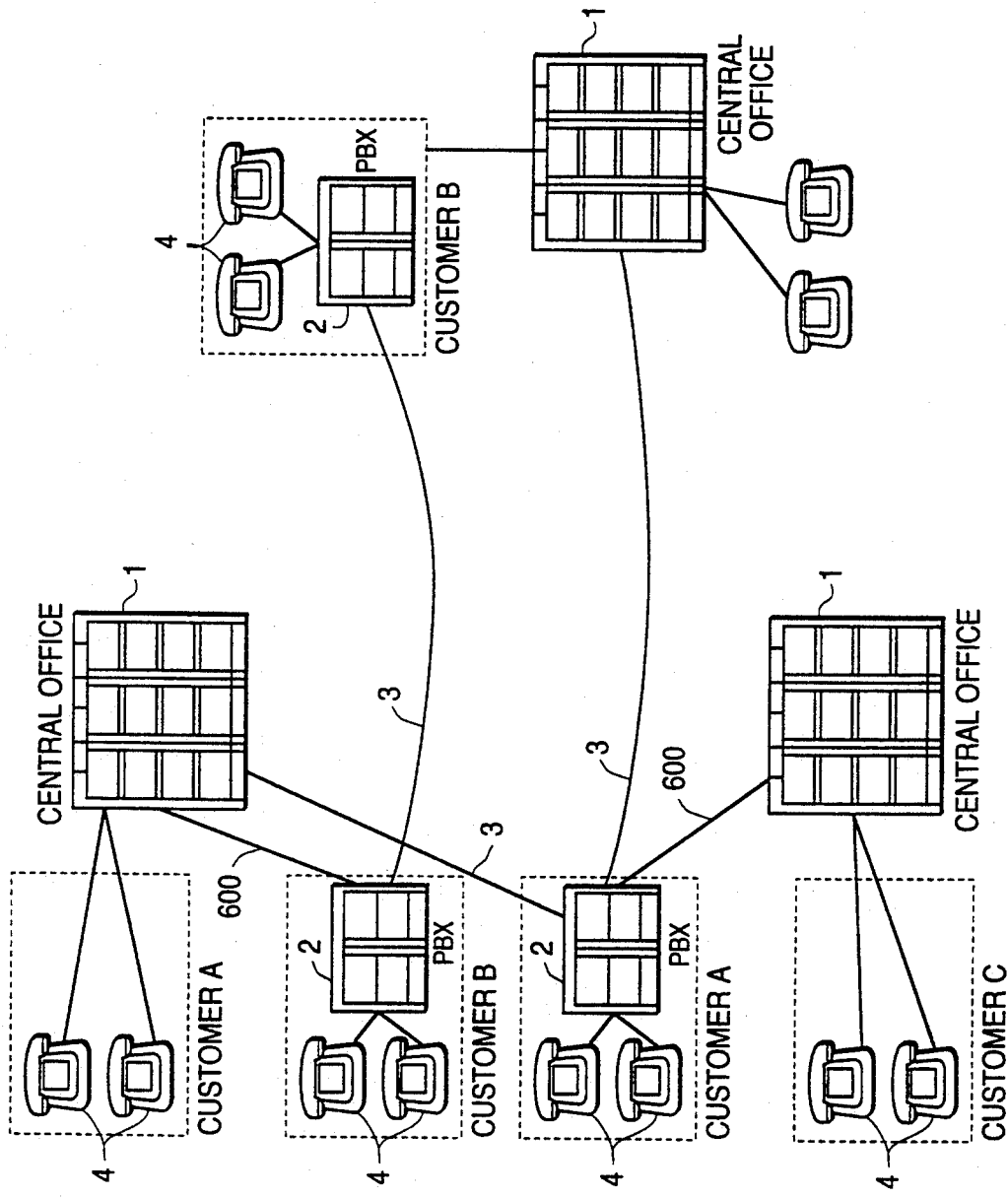
FIG. 1 is a block diagram of a telecommunications system used by multiple customers.

FIG. 1 is an example of a network with multiple customers served by a telephone company. In the example, a plurality of telephone company central office switches 1 are used to provide telephone service for a geographic area. Many customers elect to provide telephone service within a location using a PBX 2. Others elect to have telephone service provided by their telephone company through a service called Centrex which provides business services to many customers from each central office switch 1. As illustrated, a medium to large sized customer will typically have several locations, some served by Centrex and others served by PBX. See, for example, Customers A and B. The Central Office may be connected to the PBX by a CO-PBX trunk 600. Customers often have private telecommunications networks comprised of the PBX or Centrex intelligent nodes, a tie trunk 3 that interconnects the nodes and a plurality of telephone sets 4, which are also called stations.

Figure 2:
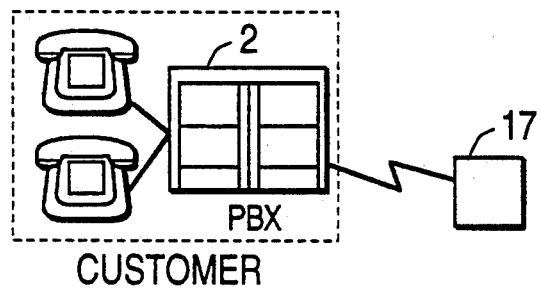
FIG. 2 is a block diagram of a capture device on a PBX switch.
Figure 3:
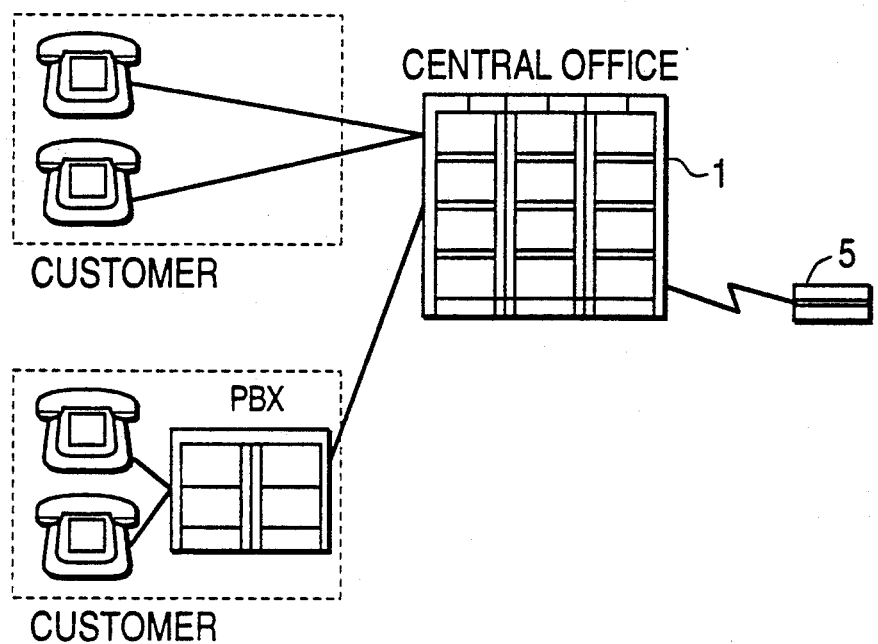
FIG. 3 is a block diagram of a message processor on a Central Office switch.

The universal MDR data record collection and reporting system includes a message processor, which is connected to one switch. A message processor is capable of collecting MDRs from switches using the following types of switch interfaces: 5ESS, available from AT&T; DMS-100, available from Northern Telecom; 1/1 AESS, available from AT&T; and compatible switch interfaces. The message processor can handle an MDR format according to the following specifications, incorporated herein by reference: 5ESS Switch ISDN Interface Applications Processor Interface Specification, Issue 4.00, Oct. 1990, AT&T 235-900-303; Output Specification Basic Communications Package Version 3, Issue 2, May 1990, AT&T 533-615-203; Northern Telecom AMAB150, release 09.01, Practice 297-1001-510; Northern Telecom Digital Switching Systems DMS-100 Integrated Business Network (IBN) Station Message Detail Recording Reference Manual, release 06.01 standard, issued Sep. 25, 1987, Practice 297-2001-119; Northern Telecom Digital Switching System Network Operations Systems Business Network Management SMDR Interface Specification, vintage NSR28 02, issued Nov. 10, 1989, compatible with NIS Q.202-1, Practice 450-1021-181; Bell Communications Research Message Detail Recording (MDR), FSD 02-02-1110, Technical Reference TR-TSY-000610, Issue 1, Jul. 1990; Bell Communications Research, Record Format for Transmitting Message Detail Recording Data from a Central Office Switching System, FSD 02-02-1120, Technical Reference TR-TSY-000620, Issue 1, Jul. 1990; Bell Communications Research, Description of the Interface Between a 1/1 AESS Switching System and a Customer Premises Message Detail Recording System, Technical Reference TR-533-23112-84-01, Issue 1, May 1984; and Output Specifications, Basic Communications Package, Version 3, Issue 2, May 1990, AT&T 533-615-203. FIG. 2 illustrates a capture device 17 connected to a PBX 2. FIG. 3 illustrates a message processor 5 connected to a Central Office Switch 1.

Figure 14:
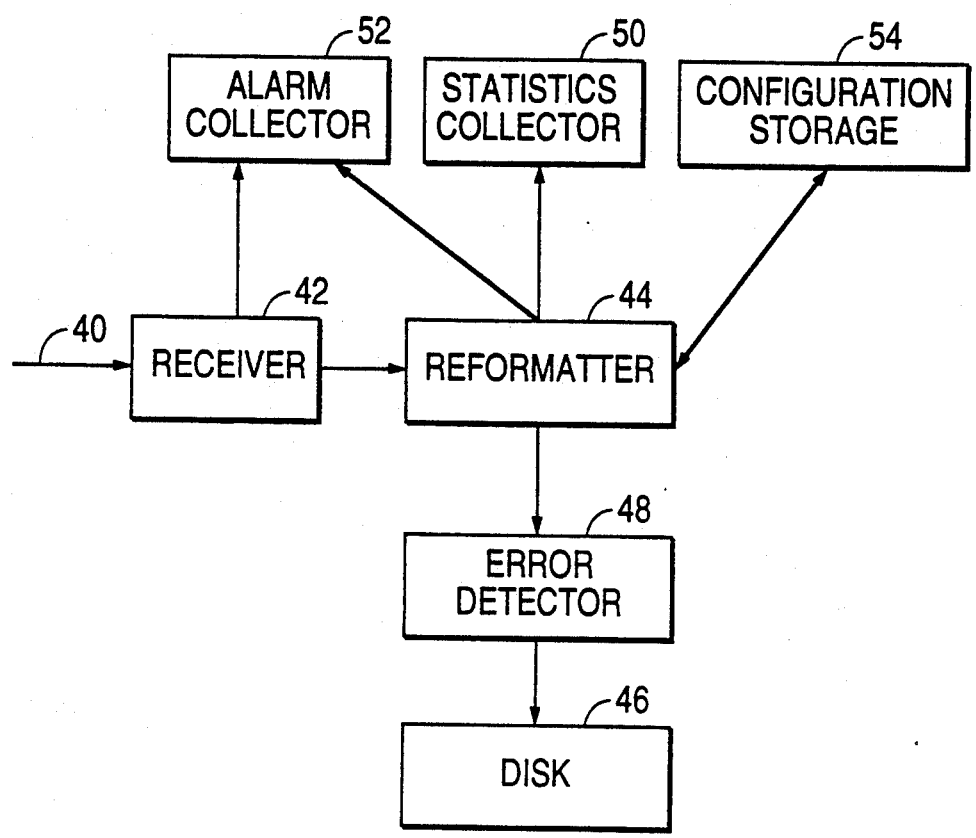
FIG. 14 is a block diagram of the message processor collection of an MDR.

As illustrated in FIG. 14, the message processor collects an MDR in the following manner. A telephone call is transmitted on the switch. When the call is completed, the switch prepares the MDR. The switch then transmits the MDR over a link 40 to a receiver 42, using a protocol appropriate to the switch, for example, X.25 or RS-232. The receiver 42 receives the MDR from the link 40. The MDR is reformatted by a reformatter 44 into an intermediate format. The intermediate format can be selected by a customer. The selected format is stored in configuration storage 54, and accessed by the reformatter 44. The message processor includes a disk 46, so that the reformatted MDR is stored on the disk and can later be retrieved. The message processor includes a separate disk file for each customer for which it receives MDRs. Thus, MDRs for each customer are segregated from other customers' MDRs on the same disk.

In addition to reformatting the MDR, the message processor includes an error detector 48 which detect errors in MDRs. Furthermore, the message processor counts and stores statistics in a statistics collector 50 for the switch. The message processor also detects errors internal to itself and stores them as alarms in an alarm collector 52.

To be useful with multiple switches and multiple customers, the message processor is configurable. The format of the MDR from the switch is one configuration to be specified, and the intermediate format is another configuration to be specified. Preferably, the message processor is configurable both when initially started and during operation.

The message processor should be located in the same office as the switch from which it captures MDRs.

Figure 4:
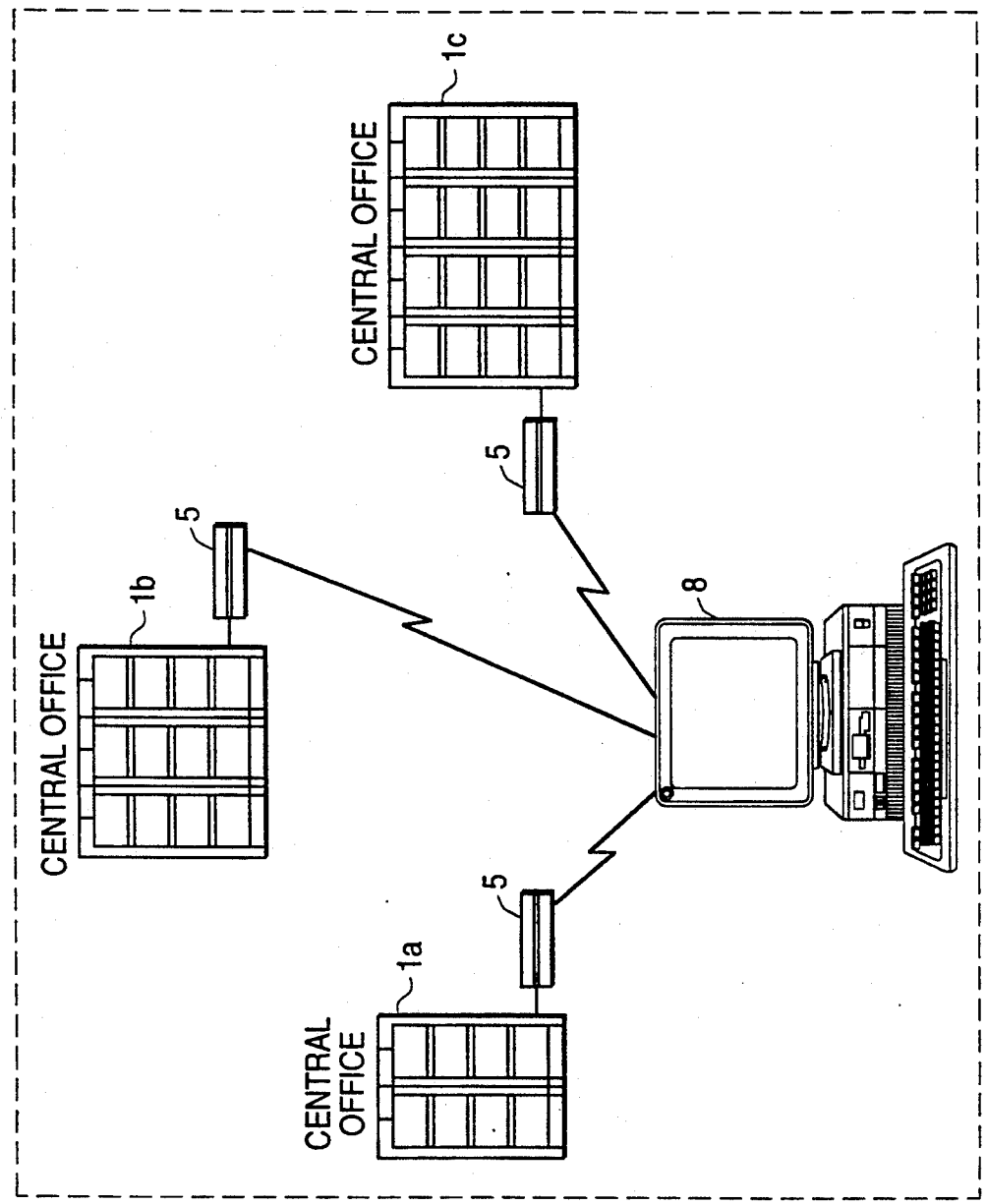
FIG. 4 is a block diagram of a monitor, showing multiple message processors, connected to switches of different types, which could be produced by different vendors, and an administrator processor.

Referring now to FIG. 4, multiple switches, which can be of different types, 1a, 1b, 1c, manufactured by different vendors, are connected to message processors 5. Each message processor 5 is connected to a single administrator processor 8. The message processors 5 and their administrator processor 8 are collectively referred to as a monitor 15.

The administrator processor 8 is used by the telephone company. The administrator processor is the recipient of alarms from each of the message processors and reports them to telephone company personnel responsible for resolving the problem. It is also the system into which the configuration is entered by telephone company personnel when a new MDR customer is added, or when the configuration changes. It later loads the configuration into each message processor that handles the customer with changed configurations. The administrator processor has an Administrative Processor Interface (APIF) 81 which forms communications between the administration processor 8 and manager 6, collector 7 and other elements, as needed. This is accomplished by downloading communications information from the administrator processor to the message processors.

In addition to being accessed by the administrator processor, the stored reformatted MDRs are accessible by a system at a central site using a specified protocol. This is preferably implemented by the message processor communicating with the central site system. The message processor transmits reformatted MDRs to the central site. The central site could be a customer site or a telephone company office.

Figure 5:
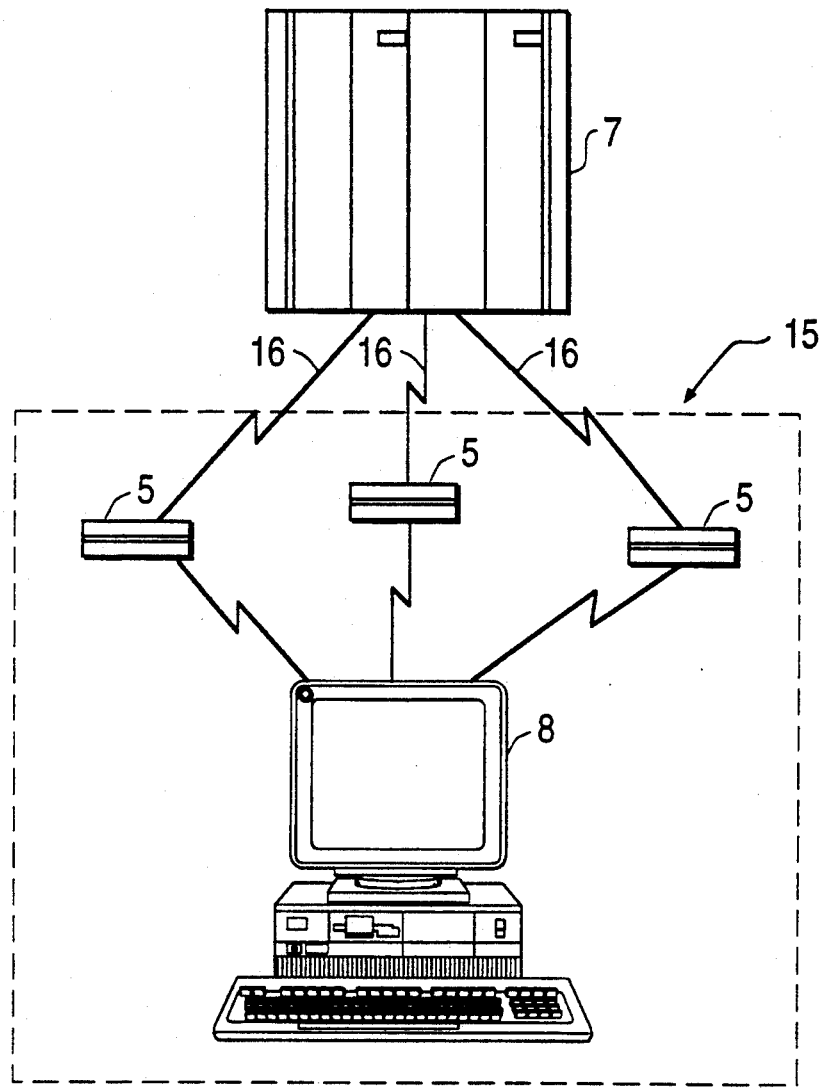
FIG. 5 is a block diagram of communication between the monitor and a collector.

Referring now to FIG. 5, one possible central site is a collector. The collector 7 receives MDRs over a transmission link 16 from several message processors 5 so that MDRs for customers with multiple locations are stored in one location. The collector obtains the MDR from the monitors in real-time if dedicated transmission links are available and uses a dial-up polling arrangement otherwise. The collector stores the MDR in a separate disk file for each customer and switch. The MDRs may be transmitted to customer's central site in real-time if a dedicated transmission link is available, otherwise they are transmitted when the collector is polled for the MDR. The collector is preferably located in a telephone company building.

Figure 6:
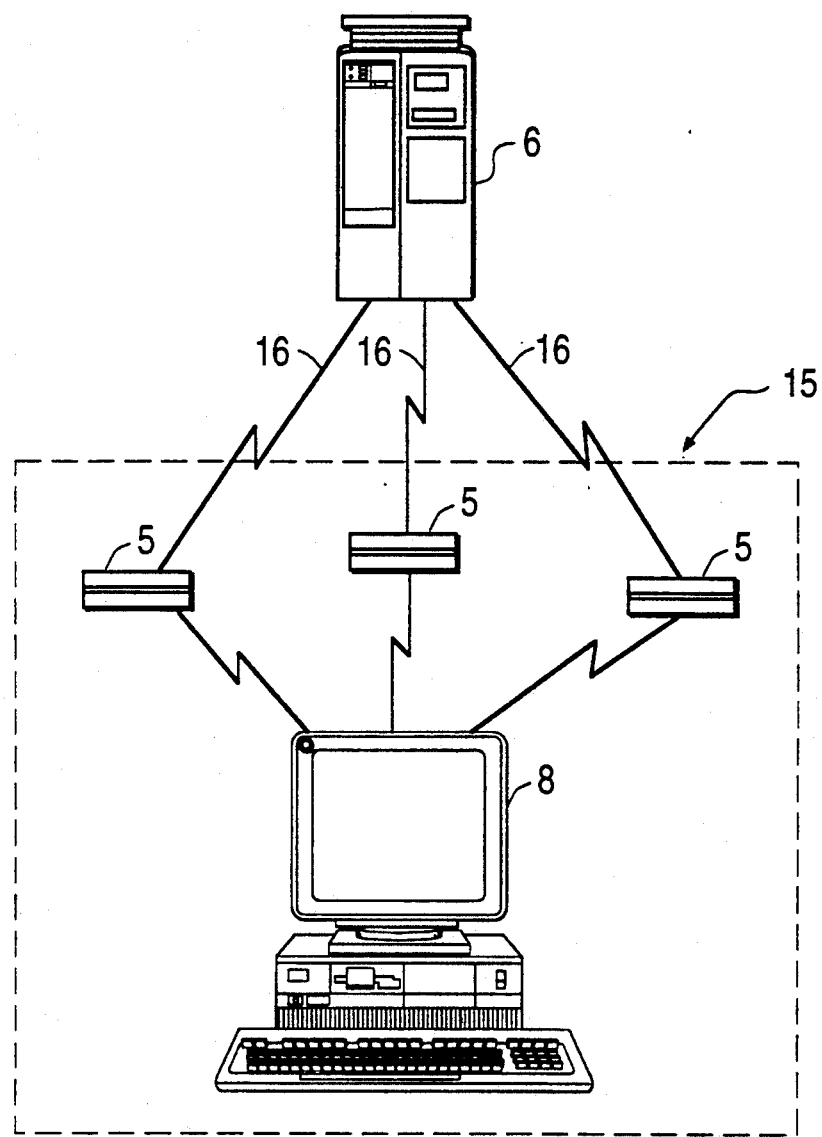
FIG. 6 is a block diagram of communication between the monitor and a manager.
Figure 7:
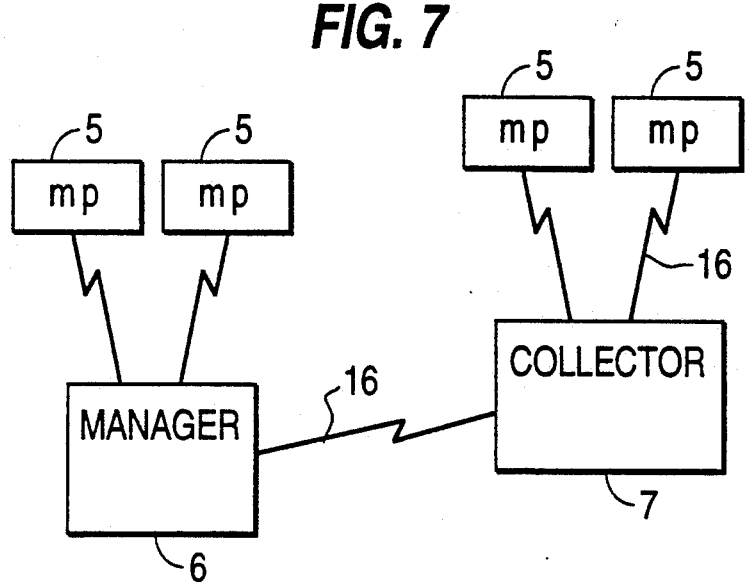
FIG. 7 is a block diagram of multiple message processors communicating with a manager and multiple message processors communicating with a collector.

Referring now to FIG. 6, another possible configuration is a manager located at a customer site. The manager 6 receives MDRs over the transmission link 16 from the monitor 15. Alternatively, as shown in FIG. 7, the manager also receives MDRs over the transmission link from the collector if the customer has multiple locations served by central offices using the same collector. The manager obtains the MDR in real-time if there is a dedicated transmission link to the message processor or collector. If a dedicated transmission link is not used, the manager establishes a dial connection to the appropriate message processor or collector to collect the MDR on a polling basis. The manager then uses the MDR to cost calls for a departmental telephone bill or for other management purposes. The manager is preferably located at a customer's location.

Figure 8:
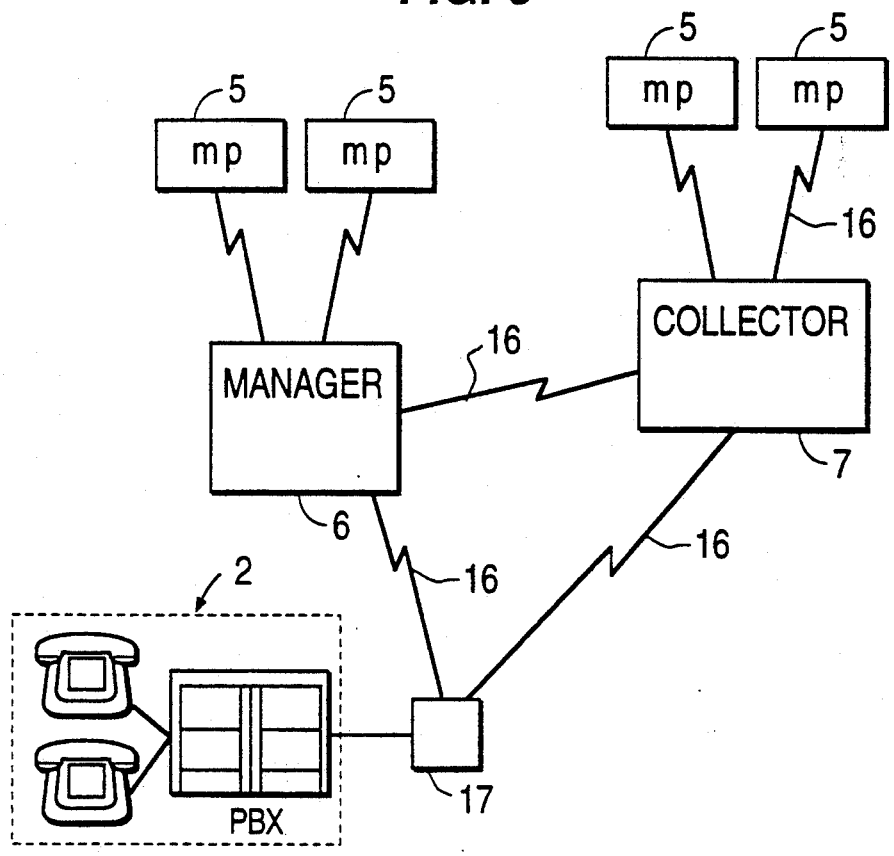
FIG. 8 is a block diagram of multiple message processors and a simplified MDR capture device communicating with a manager and a collector.

FIG. 8 shows the collection device 17 connected to a switch, for example, a PBX 2. The collection device has rudimentary ability to capture and store MDRs. The collector 7 or manager 6 can obtain stored MDRs from the collection device by a transmission link 16, using real-time if the transmission link 16 is dedicated, and using a polling arrangement otherwise.

Figure 9:
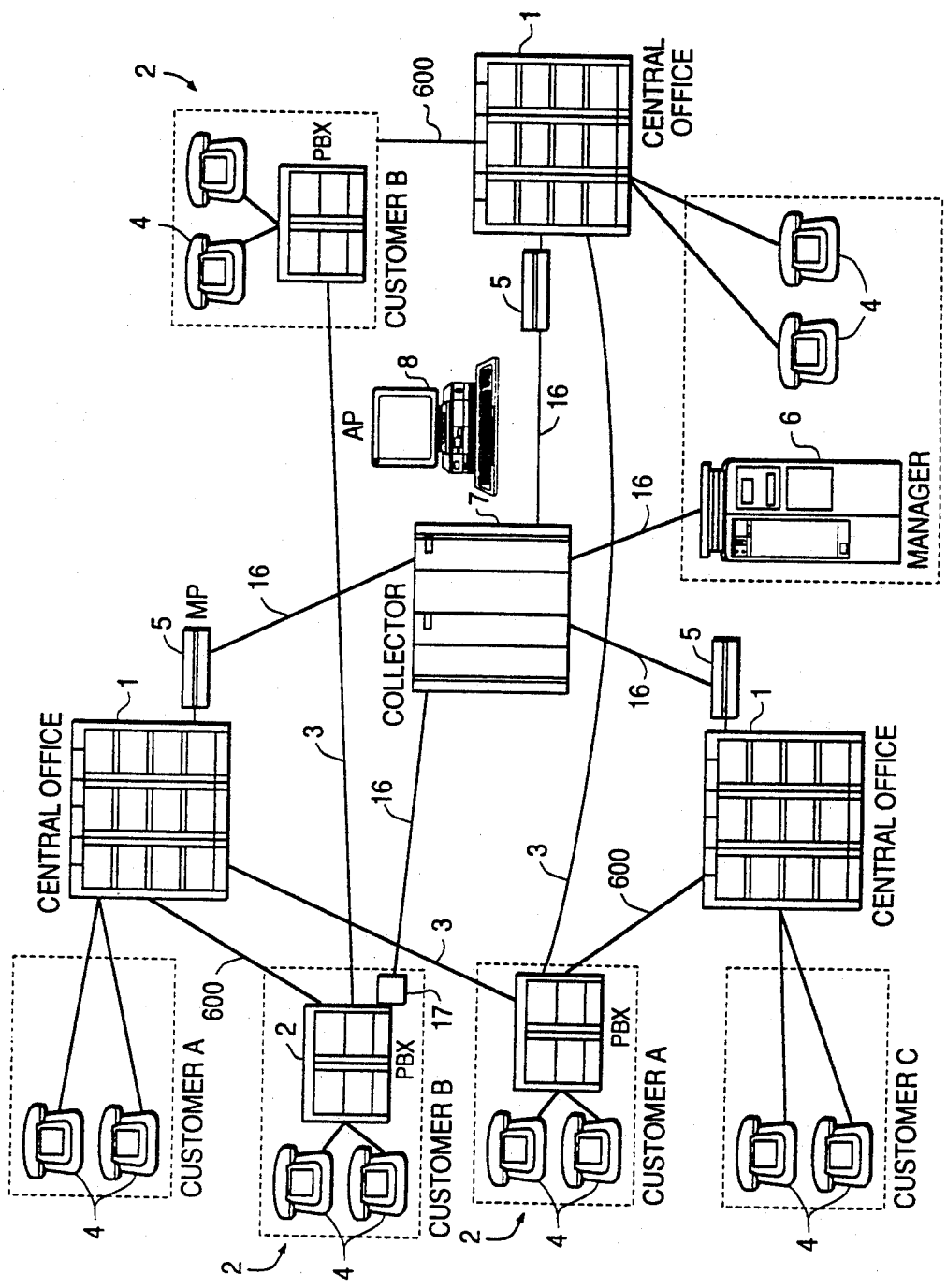
FIG. 9 is a block diagram of a telecommunications system of FIG. 1 using a universal MDR data record collection and reporting system, including a monitor, a manager and a collector.

FIG. 9 illustrates one example of a universal MDR collection/reporting system on a telephone network corresponding to FIG. 1. In this example, the system includes the monitor having several message processors 5 and one administrator processor 8. In this example, the transmission link from the message processor 5 to the administrator processor 8 is a dial-up telephone line as opposed to a dedicated link. Therefore, in FIG. 9, the administrator processor 8 is not connected. The system of this example also includes one collector 7 and one manager 6. In this example, the manager 6 only communicates with the collector 7. The collector 7 communicates with the monitor via the message processors 5. One PBX includes a collection device 17, with which the collector 7 communicates. Customer B has two PBXs connected by a tie trunk 3. Customer A is connected by two tie trunks 3 to two central offices.

The message processor may be implemented on one or more microprocessors. The message processor is a high performance computing apparatus designed to reside in a telephone company central office. The hardware is designed to be mounted in either a 19" or 23" rack housing double eurocard (9.2" high by 6.4" deep) VME bus plug in cards which are bused in a manner that permits a modular building block approach to system expansion. The VME bus uses a VME standard which consists of a standard I/O bus for data transfer of memory and I/O. The message processor may use a 16 bit I/O transfer method, as known to those skilled in the art. A P2 connector is used for a SCSI bus and optionally for a full 32 bit transfer if necessary. These boards are multi-layer to allow for maximum density and noise immunity. Each board has one or two bus connectors and a 0.8" to 1.6" wide by 10.3" high metal front panel.

Figure 15:
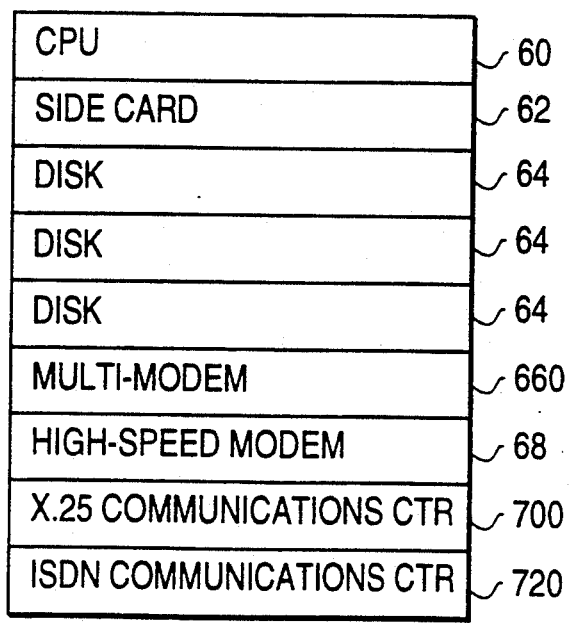
FIG. 15 is a block diagram of the message processor hardware.

The architecture includes a number of plug in cards mounted in a 19 or 23 inch shelf. FIG. 15 shows the message processor's hardware architecture. One possible CPU card 60 is a Motorola 68EC030 based microcomputer board in a 3U form factor. A side card 62 also in a 3U form factor is attached to a primary board and contains a SCSI controller and an MC68302 to handle communications protocols. Equivalent components my be substituted, as would be known to one of ordinary skill.

The message processor CPU card 60 is based on a 32 bit external 68EC030 processor operating at 25 MHz. This processor provides the message processor with significant data handling capability. One or 4M bytes of dynamic RAM is available for program execution and temporary storage. A plurality of VLSI chips provide the full VME bus capability including arbitration, interrupt generation and handling, and data block transfers. Preferably, two full duplex, asynchronous, RS-232 ports are accessed through RJ-11 connectors on a front panel of the CPU board.

Figure 16:
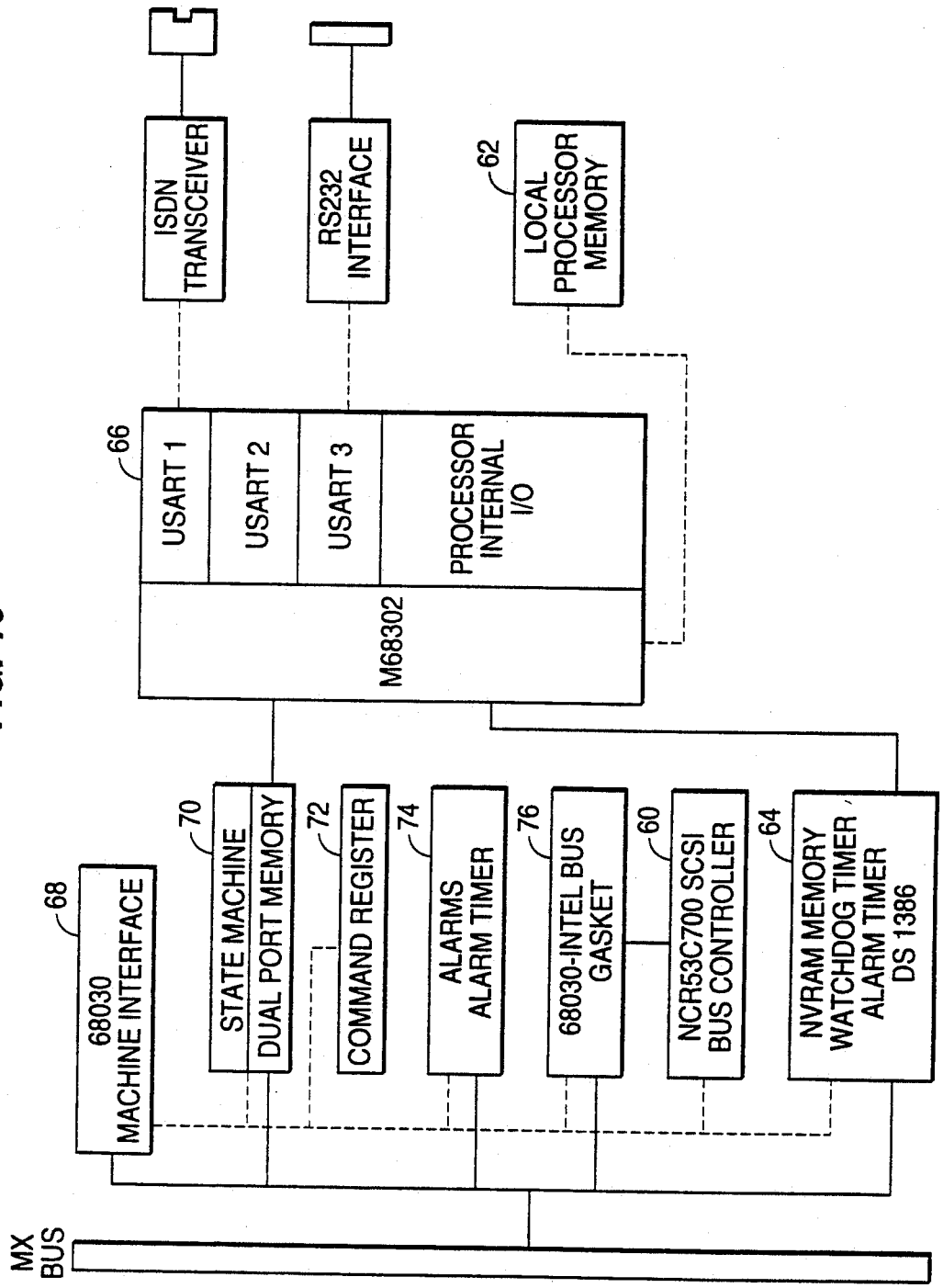
FIG. 16 is a circuit diagram of the side card of the message processor.

The side card 62 is connected to the bottom of the CPU card by a modular connector. The side card my be directly below the CPU card when they are mounted in the message processor shelf. This card supports the central office switch interface and my therefore have several variations. Referring now to FIG. 16, it should include a NCR 700 series or equivalent SCSI disk controller 60 capable of working in a simplex or mirrored disk environment, a real time clock providing calendar and clock functionality, up to 32 kbyte of battery backed CMOS static RAM 62 and a software controlled watchdog timer 64. The side card has a MC68302 processor to handle communication protocols including ISDN/BRI OB+D, X.25 LAP D and a single port on the front panel of the board providing ISDN for the 5ESS switch and X.25 LAP A communications for the 1AESS switch. Also included are a state machine 70, command register 72, alarm timer 74, and bus gasket 76.

Storage is provided on a disk 64. A standard 3.5" SCSI hard disk such as known to those of ordinary skill in the art is provided. The disk is mounted on a commercially available size, two width (1.6"), double eurocard module. The SCSI interface uses the P2 connector to communicate between the CPU board and a disk subsystem. Disk drives of 60, 100, and 210 MB are used, depending on required storage capacity. Up to three disk subsystems (for a total of four) can be added to the system to increase storage capacity. Other standard size drives could be substituted. Each hard disk subsystem is placed in the chassis in a predesignated slot (simplex versus mirrored) and contains LED indicators showing disk activity and a fault light that indicates that the CPU has determined that the drive is no longer reliable. Disks can be removed/inserted into a running system.

A X.25 communications controller card 700, as known to those of ordinary skill, provides a minimum of one port supporting up to 56 kbps via X.25 LAP B. Front panel status and fault indicators report controller activity and board failure.

An ISDN communications controller board 720, as known to those of ordinary skill, provides a minimum of one port of ISDN Basic Rate Interface capability over 2B+D channels. The board contains a front panel failure indicator.

Figure 17:
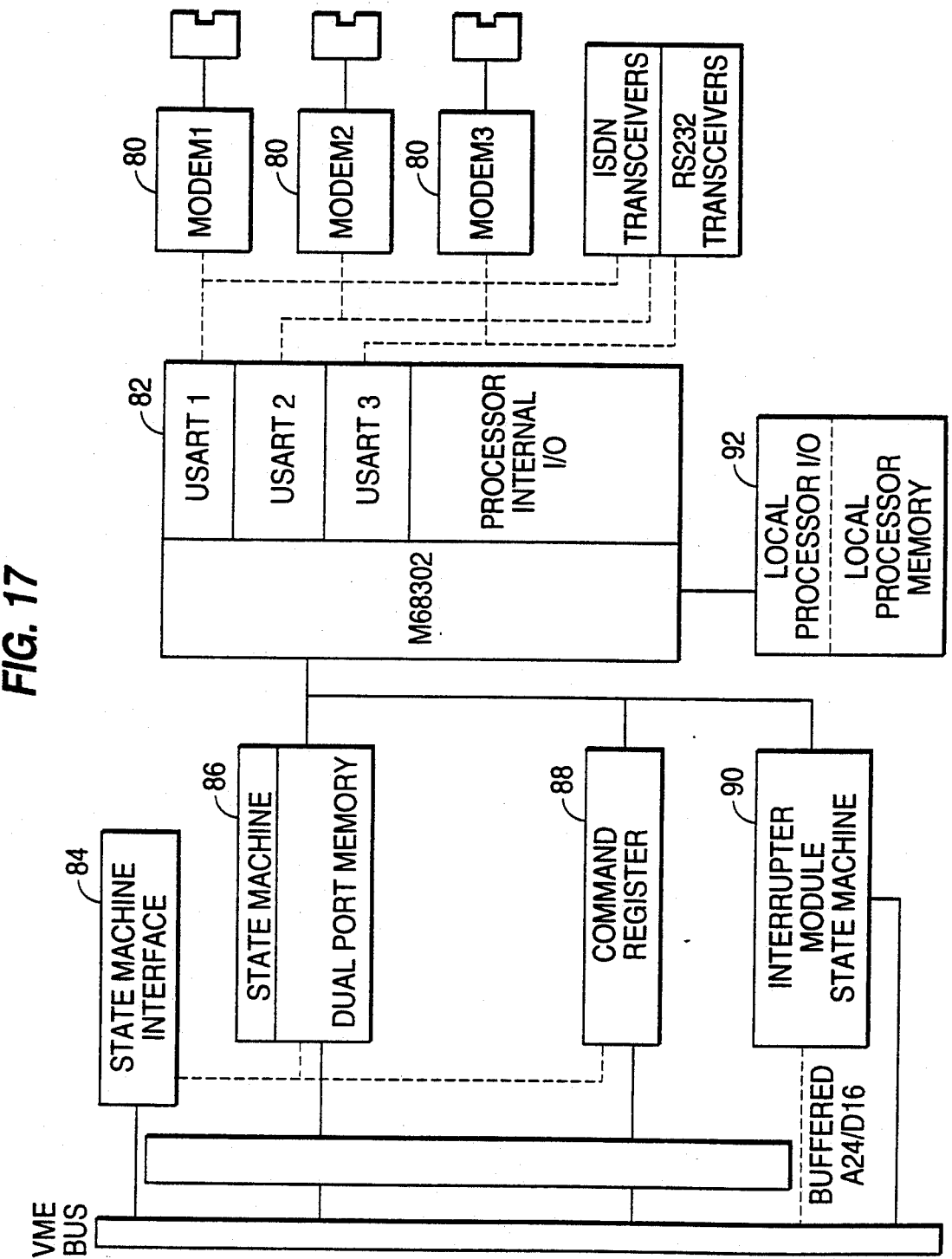
FIG. 17 is a circuit diagram of the multi-modem card.

As shown in FIG. 17, a Multi-modem card 660 supports three 2400 baud modems 80 (CCITT standard V.22 bis) using a MC68302 82. RJ-11 connectors and LEDs of modem activity and failure indicator are located on the front panel. Up to 8 total modem cards (multi and high speed) can be supported by a single message processor system. Also included are a state machine interface 84, a state machine with dual port memory 86, a command register 88, an interruption module state machine 90, and local processor I/O and memory 92.

A standard High Speed modem card, as known to those of ordinary skill, has two 9600 baud, MNP 5 modems (CCITT V.32 standard) to provide high speed access to users of the system. LED indicators of modem activity and board failure are located on the front panel.

The cards are mounted in the message processor shelf which contains a VME backplane, 48 VDC power converter, power switch, alarm status/connections, and mechanically holds all plug in cards. A front cover completely encloses all cabling in the unit. The shelf is 21" high, 17.5" wide and 11" deep and mounts in a standard 19" or 23" wide rack. A shelf houses up to 20 slots. The minimum message processor system size is:

| | |
|---|---|
| CPU | 1 slot |
| Disk subsystem | 2 slots |
| Multi-modem (3 @ 2400 baud) | 1 slot |
| Total | 4 slots |

The message processor shelf power requirement is −42V to −60V supplied by 48 volt CO battery power. A DC to DC converter is mounted in the shelf to supply regulated +5 VDC and ±12 VDC.

An alarm board provides critical, major and minor alarm signals (relay contact closures) as generated by various system components. It is mounted at the top of the shelf.

The message processor can also be implemented as software running on a microprocessor. The microprocessor should run an operating system which performs multi-tasking. One suitable microprocessor is the 68030 processor on the CPU card under a multi-tasking operating system. A suitable operating system is Microware System's Corporation OS-9 ® operating system, a modular multitasking and multi-user operating system for the Motorola 68000 family of processors. The suitable operating system allows the message processor to be readily configured for use in any type of system from small single-board computers to large multi-user systems.

It is further preferable that the operating system has a kernel providing multi-tasking, interprocess communication, memory management, and input-output, and a set of utilities for housekeeping, management and customization of software. OS-9 consists of the kernel (which provides multi-tasking, inter-process communication, memory management and input-output) and a set of utilities (for housekeeping, management and customization of the software environment). Its system interfaces are very similar to those of the UNIX ® operating system.

Figure 10:
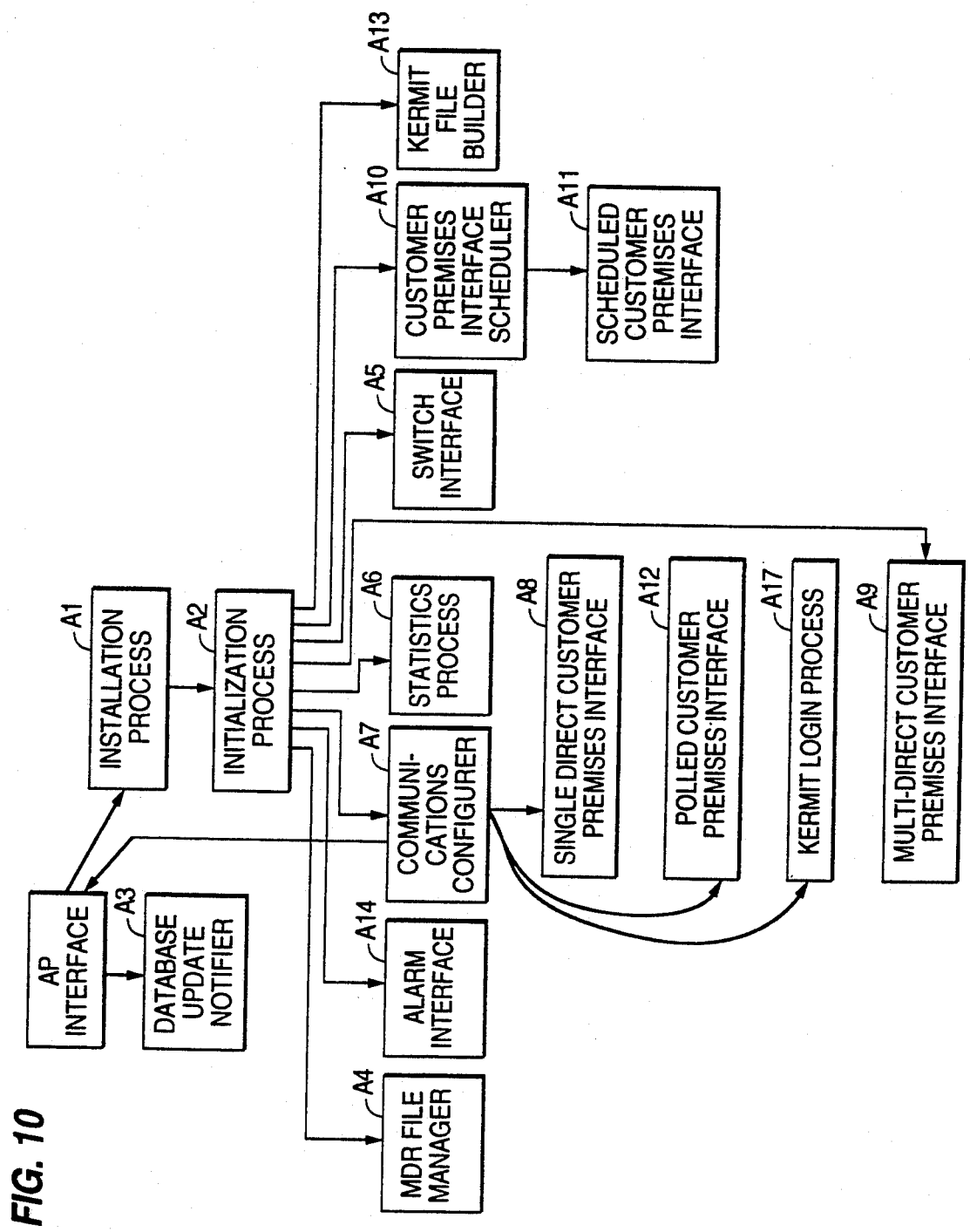
FIG. 10 shows message processor processes and indicates called processes.

The message processor may be implemented as a set of processes, each of which carries out a specific function. FIG. 10 shows the major processes, with arrows indicating called processes. OS-9's multi-tasking environment allows these processes to work in parallel while communicating via messages; in the preferred implementation, the software generally uses named pipes to carry a plurality of inter-process messages. Table 1 lists the message processor software processes along with a description of each processes' function. (In the following tables, administrator processor is abbreviated as AP, and message processor is abbreviated as MP.) Processes which are not shown are not directly called from other processes.

TABLE 1

| Process Name | Element | Description |
|---|---|---|
| | Message Processor Processes | |
| Installation Process | A1 | The Installation Process starts the processes necessary to allow the AP to download MP executable software and data to the MP and disk. |
| Initialization Process | A2 | The Initialization Process is responsible for starting certain MP processes that run continuously (e.g. Switch Interface). |
| Database Update Notifier | A3 | The Database Update Notifier is responsible for notifying processes that a database update has occurred. |
| MDR File Manager | A4 | The MDR File Manager is responsible for initializing the MDR file system and for adding and removing Customer MDR Files. |
| Switch Interface | A5 | The Switch Interface receives MDRs from a telephone switch, translates them to the customer's MDR format, and stores them in the appropriate Customer MDR file. |
| Statistics Process | A6 | The Statistics Process is responsible for the periodic gathering of MDR file statistics and the initialization/termination of records in the MP Statistics File and the Customer Statistics Files. |
| Communications Configurer | A7 | The Communications Configurer is responsible for configuring the various ports used by Customer Premises Interfaces, setting up customer log-ins on the MP, and for executing Customer Premises Interfaces on the appropriate ports. |
| Single Direct Customer Premises Interface | A8 | The Single Direct Customer Premises Interface immediately transmits MDRs to a single customer. |
| Multiple Direct Customer Premises Interface | A9 | The Multiple Direct Customer Premises Interface immediately transmits MDRs to multiple customers. |
| Customer Premises Scheduler Interface Scheduler | A10 | The Customer Premises Interface executes the Scheduled Customer Premises Interface at previously scheduled times. |
| Scheduled Customer Premises Interface | A11 | The Customer Premises Interface transmits MDRs to customer premises at previously scheduled intervals. |
| Polled Customer Premises Interface | A12 | The Customer Premises Interface sends MDRs to the customer at the customer's initiation. |
| Kermit File Builder | A13 | The Kermit File Builder reads MDRs from Customer MDR Files and places them in |

TABLE 1-continued

Message Processor Processes

| Process Name | Element | Description |
| --- | --- | --- |
| | | Discovery Files for Kermit to transfer to a Discovery/Centrex product. |
| Alarm Interface | A14 | The Alarm Interface sends alarm messages to the alarm port on the AP. |
| Kermit Login Process | A17 | The Kermit Login Process is responsible for allowing login using kermit protocol. |
| AP Interface | A18 | The AP Interface is responsible for interfacing to the Administrator Processor. |
| Errored MDR Reprocessor | (not shown) | The Errored MDR Reprocessor reads MDRs from the Errored MDR File and attempts to determine the Customer MDR File in which to write them. |
| Overflow MDR Reprocessor | (not shown) | The Overflow MDR Reprocessor reads MDRs from the Overflow MDR File for a customer and attempts to write them to the Customer MDR File for the customer. |
| MP Data Loader | (not shown) | The MP Data Loader is responsible for loading formatted ASCII data into the MP data files. |
| MP Data Unloader | (not shown) | The MP Data Unloader is responsible for converting data from MP data files into formatted ASCII data. |
| MP Data Entry Process | (not shown) | The MP Data Entry Process is an interactive process that formats MP data file contents for viewing and allows entry of data into MP data files on an item-by-item basis. |
| MP Pipe Message Generator | (not shown) | The MP Pipe Message Generator is a process that creates and sends pipe messages to processes. Its primary purpose is to create pseudo messages for testing. |

It will readily be appreciated that many variations of the assignment of functionality are possible to the skilled designer.

This disclosure herein describes one embodiment of the invention where the message processor collects an MDR from an AT&T 5ESS ® switch and delivers it in one of the selected formats.

We will now describe the steps involved in collecting an MDR from the switch 1 and delivering it to the customer's manager 6. The message processor 5 is first involved when a call on the switch 1 has been completed and the MDR prepared by the switch. The 5ESS switch transmits the MDR data on a ISDN link using D channel packetized data. As the receiver 42, the Switch Interface process A5 retrieves the record from the X.25 packet assembler/disassembler. As the reformatter 44, it then examines the MDR to determine which customer's MDR was received and converts it into the desired output format, for example, Ameritech Call Detail Recording System or Bellcore AMA Format, selected for that customer. The reformatted MDR is then written into one of a series of disk files on disk 46. Preferably, the disk file is suitable for later transmission using a file transfer communications protocol, such as Kermit. The statistics for the switch and that customer are updated. The Switch Interface process is described in more detail below.

The reformatted MDRs can be read from the disk file. The MDRs are read and transmitted by the transmitter when the central site system, for example the customer's manager, calls the message processor to initiate a polled transfer. The operating system and hardware automatically answer the call and allow a log-on. When the message processor answers the call and the customer logs on, the Kermit Login Process A17 is activated. The Kermit login process is also described in more detail herein.

The message processor must collect statistics which are used, for example, to ensure that an adequate number of communications links are available to handle switch to message processor MDR traffic and to decide when more links should be added. Therefore, in this embodiment, a Statistics Process A6 acts as a statistics collector and collects statistics for use in producing management reports for the telephone company. The Statistics process runs on a scheduled basis and periodically, for example, each hour transmits a request to send statistics for the previous time period to the Switch Interface process and Kermit File Builder processes (as well as to all single direct customer premises interfaces A8 and multi-direct customer premises interfaces A9). Periodically, the administrator processor should log on to each message processor and collect statistics. Statistics my be collected by translation intoASCIi and transmitted by the message processor Data Unloader process.

The message processor is configurable for the specific switch 1. The type of switch with which the message processor will be used is specified to the administrator processor and then downloaded via a communications line. This allows the message processor software specific to a type of switch to be downloaded from the administrator processor and updated easily if switch software changes, or the MDR format to be modified by the administrator processor.

When the message processor leaves the factory, the OS-9 operating system is in ROM and the Installation Process A1 is on the hard disk. When the message processor is turned on for the first time, the Installation Process A2 initializes modem software and then starts a known OS-9 tsmon process which enables an administrator processor communications port for login purposes. The administrator processor logs onto the message processor and uses the OS-9 command interpreter to run utility programs to download the software and update database records as needed. After an initial installation of software, the Initialization Process A2 is started. Subsequently, it will be started automatically when the message processor is restarted.

The Switch Interface process is described with reference to the flow chart in FIG. 11. At step 100, the Switch Interface process starts when it is initiated by the Initialization Process A2. At step 101, the 5ESS version of this software first initializes an ISDN packet driver by calling a known ss_opt() and a known isd-n_cfg() functions. The ISDN packet driver is the interface to the MDRs from the 5ESS which are carried as ISDN D channel packet data. (The DMS-100 TM version of this process is described later). Next, at step 102, a named pipe is created using the known open() system call to receive commands. At step 103, the customer database is read and a customer information list entry built for each customer. The statistic counters are then initialized at step 104. The final initialization step, 105, is to initialize the MDR file interface by using known operating system calls to establish the Switch Interface process as a writer for the files, and to establish the linkages between customers and their MDR files.

At step 106, the Switch Interface process then waits to receive either an MDR from the switch or an IPC message from another process. Then, at step 107, the Switch interface process determines whether it received an MDR or an IPC message.

If an MDR was received, at step 115, MDRs are read from the ISDN packet driver by the MDR Reader which increments the count of MDRs received from the switch and checks to see if the MDR contains a valid customer ID. MDRe which are in error as determined in step 107a are stored so that they my be reprocessed after the error is fixed. Therefore, there may be an Errored MDR file to store MDRs which are in error. Furthermore, there may also be a file, for example, an errc.dat file, for storing a small number of MI)Rs which are in error. The file my be examined by an operator, so that the operator can determine the cause of the error, and then can fix the cause of the error. Therefore, if an error was returned by the MDR Reader, as determined in step 107a, a check is done to see if the Errored MDR files are full at step 116. If not, the Errored MDR Handler is called at step 118 to write a copy of the MDR (as received from the switch) to the Errored MI)R File and another copy to the errc.dat file if this file contains less than 25 MDRs. If an error was not returned from the MDR Reader, the MDR writer is called at step 108.

Figure 12:
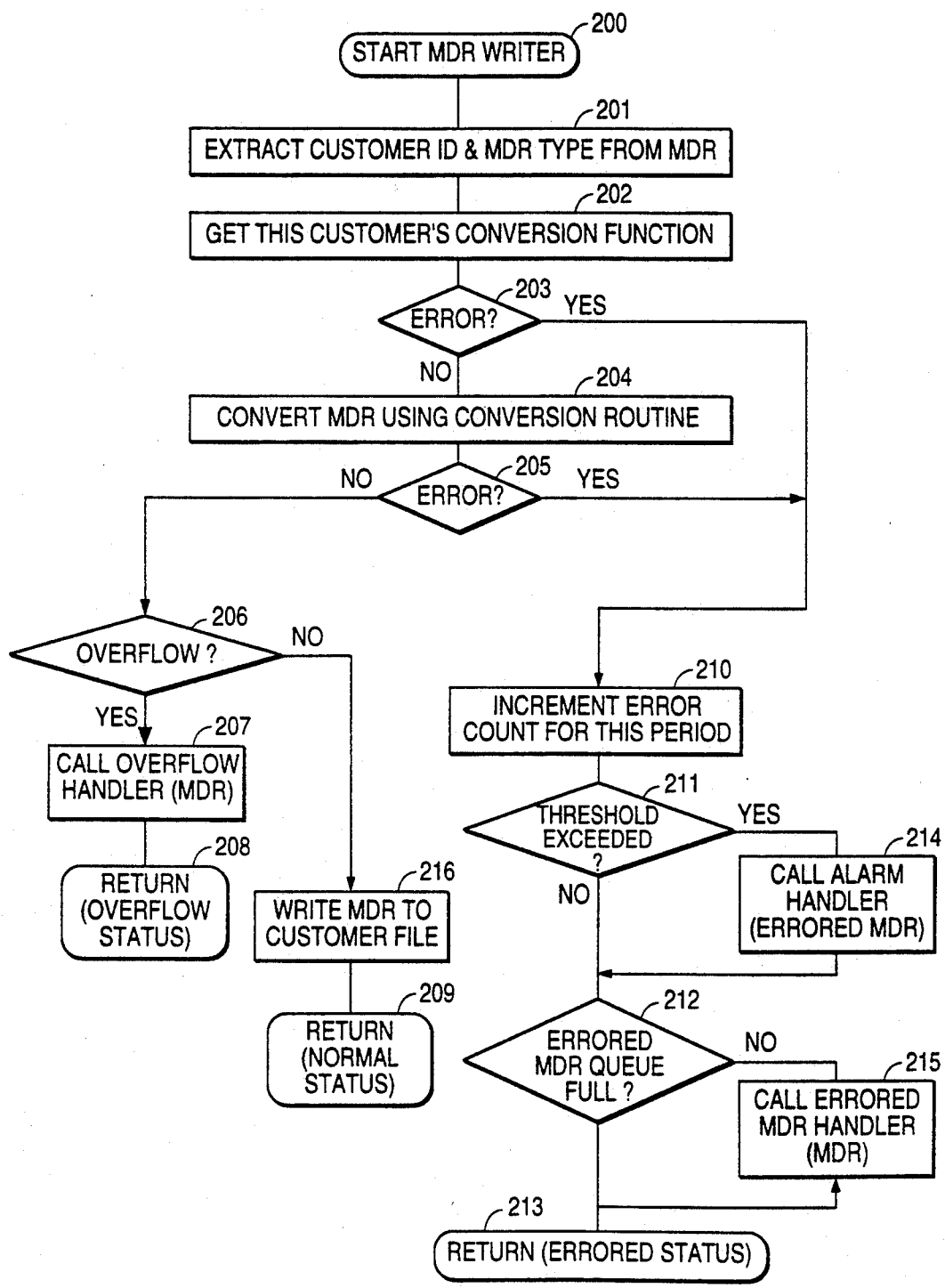
FIG. 12 is a flow chart of the MDR writer.

The MDR Writer's logic is described with reference to FIG. 12. At step 200, the MDR writer starts when it is called from the Switch Interface process. At step 201, it extracts the Customer ID and MI)R type from the MDR received from the switch. At step 202, it uses these to look up the MDR conversion routine for that customer and switch and, at step 203, checks to see if there was an error. If not, at step 204 the conversion routine just looked up is called to convert the MDR into the output format selected for the customer owning the MDR. At step 216, if the conversion was successful, (no errors found in step 205 and no overflow detected at step 206) the MDR is written to the customer MDR file and, at step 209, the MDR writer returns with a success status. If writing that MDR would have caused an overflow, at step 207, the Overflow Handler is called to write the MDR to the overflow file and, at step 208, the MDR Writer returns with an overflow status code. At step 210, if step 205 determined that there were errors finding the conversion routine or converting the MDR to the customer's format, the switch error count for the period is incremented. At step 211, if the incremented error count exceeds the threshold, the Alarm Handler is called. The Alarm Handler sends the error message to the Alarm Interface process. If the errored MDR queue is not full, as determined in step 212, at step 215, the Errored MDR Handler is called to write the MDR to the errored MDR file and, at step 213, the MDR writer returns with an Errored status.

Figure 11:
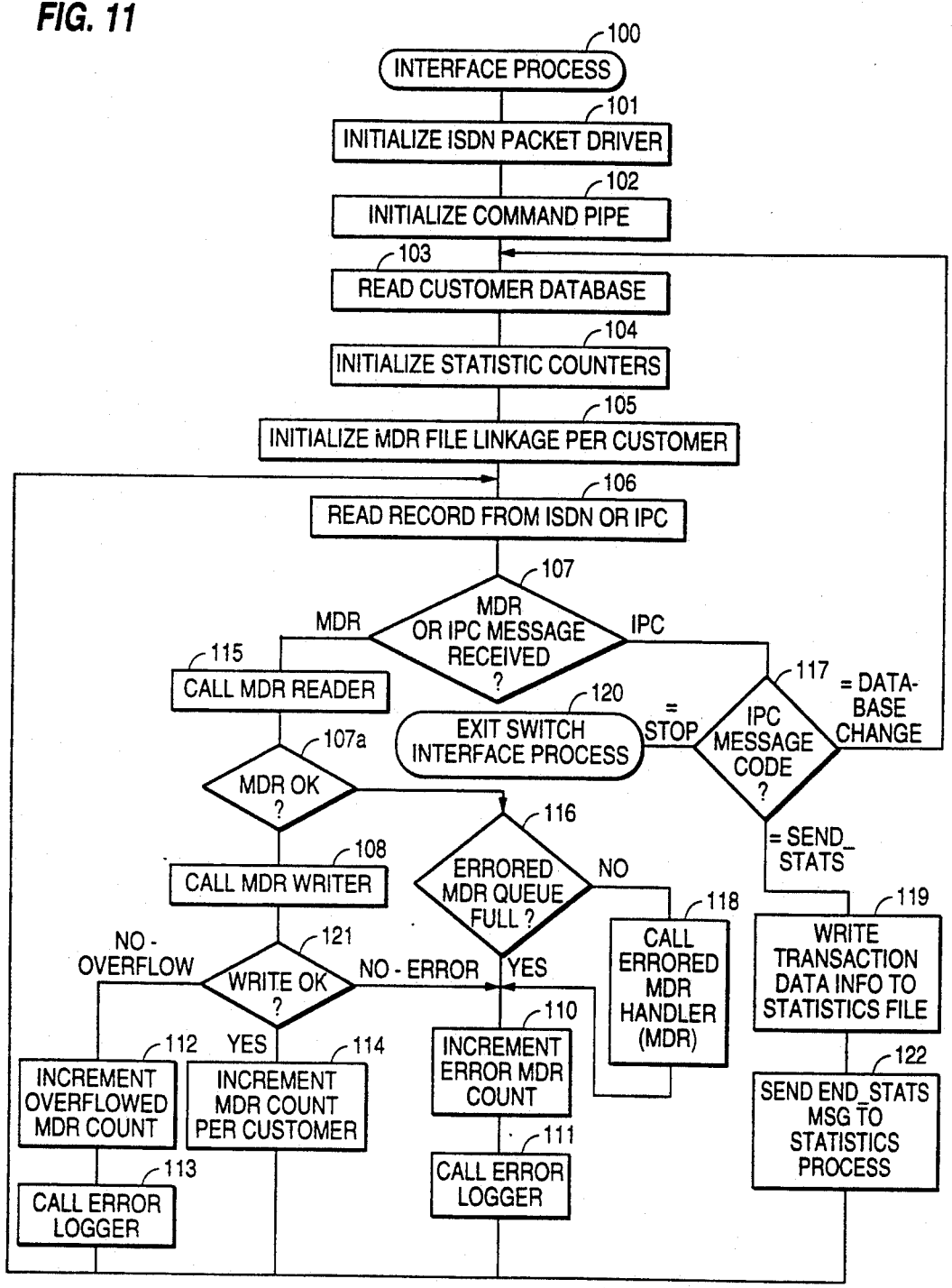
FIG. 11 is a flow chart of the switch interface.

Continuing after returning from the MDR writer at step 121 in FIG. 11, the status code is checked to see if the write was successful. If so, at step 114, a per customer MDR counter is incremented. If an Errored or Overflow status was returned, at step 110, an error counter or, at step 112, an overflow counter for the current period is incremented and the Error Logger is called at step 111 to write an error message to the error logging system. The Switch Interface process then loops to step 106 to read the next MDR or IPC message.

Referring now to FIG. 11, if step 107 determined that the Switch Interface process received an IPC message at step 106, at step 117 it tests the message code in the IPC message. If the message was a Database change message, the Switch Interface process branches to repeat a portion of its initialization starting with reading in the modified database at step 103. If the message was a Send Statistics request, the transaction data information collected during the statistics collection period is sent to the Statistics Process in an IPC message at step 119 and then an end of statistics message is sent at step 122 to indicate the end of statistics data. The Switch Interface process then loops to read the next MDR or IPC message at step 106. If the message was a Stop message, the Switch Interface process exits at step 120.

In the case of the DMS-100, the MDR data is transmitted from the switch on either an asynchronous RS-232 interface that can be used to print the MDR or on a Pertec 9-track tape drive interface that can also be used to connect to an automatic message accounting data accumulator or a tape drive. Therefore, MDRs can be collected by simulation of these devices. In the DMS-100 version of Switch Interface process, the call to initialize the ISDN packet driver at step 101 is replaced with a call to initialize a communication port. The MDR Reader then reads the MDR from the communications port instead of from the ISDN Packet driver.

Tables 7(a)–(e) describe MDR formats some of which are used by the message processor. Tables 7(a)–(c) describe reformatted MDRs, while Tables 7(d) and (e) describe MDR formats from the switch. The Bellcore AMA Format (BAF) was primarily intended for storing call billing information for use in billing telephone subscribers. The BAF has a modular design with separate modules for various purposes as shown in FIG. 7(a). Several of the existing BAF modules and a few additional ones were selected for use in MDR as shown in Table 7(b). MDR formats are determined by the type of switch to which the message processor is connected. Two popular kinds of switches are the AT&T 5ESS and the Northern Telecom DMS-100 whose MDR formats are shown in Table 7(d) and Table 7(e) respectively. The conversion routines called at step 204 in the MDR writer convert the MDR from the MDR format into the selected reformatted MDR.

TABLE 7
MDR Formats
Table 7(a) Bellcore AMA Format Structure Classification

| Structure Code | Classification | Structure Code | Classification | Structure Code | Classification | Structure Code | Classification |
|---|---|---|---|---|---|---|---|
| 1 | AMA | 96 | AMA | 368 | AMA | 664 | AMA |
| 2 | AMA | 97 | AMA | 369 | AMA | 665 | AMA |
| 15 | AMA | 101 | AMA | 500 | AMA | 670 | ISDN |
| 16 | AMA | 105 | AMA | 501 | AMA | 671 | ISDN |
| 19 | AMA | 115 | AMA | 502 | AMA | 674 | ISDN |
| 20 | AMA | 120 | AMA | 503 | AMA | 675 | ISDN |
| 21 | AMA | 125 | AMA | 614 | AMA | 685 | ISDN |
| 24 | AMA | 127 | AMA | 615 | AMA | 686 | ISDN |
| 25 | AMA | 128 | AMA | 616 | AMA | 691 | ISDN |
| 27 | AMA | 135 | AMA | 625 | AMA | 692 | ISDN |
| 28 | AMA | 140 | AMA | 627 | AMA | 693 | ISDN |
| 35 | AMA | 141 | AMA | 629 | AMA | 694 | ISDN |
| 54 | AMA | 179 | AMA | 631 | AMA | 695 | ISDN |
| 68 | AMA | 190 | AMA | 633 | AMA | 696 | ISDN |
| 76 | AMA | 194 | AMA | 635 | AMA | 800–999 | BOC |
| 79 | AMA | 360 | AMA | 645 | AMA | 40001 | MDR |
| 80 | AMA | 361 | AMA | 647 | AMA | 40079 | MDR |
| 86 | AMA | 362 | AMA | 653 | AMA | 40670 | ISDN |
| 87 | AMA | 363 | AMA | 654 | AMA | 40674 | ISDN |
| 92 | AMA | 364 | AMA | 655 | AMA | 40693 | ISDN |
| 93 | AMA | 365 | AMA | 656 | AMA | 40695 | ISDN |
| 94 | AMA | 366 | AMA | 657 | AMA | | |
| 95 | AMA | 367 | AMA | 662 | AMA | | |

TABLE 7(b)
Bellcore AMA Format Modules

| Module Code | Classification | Description |
|---|---|---|
| 0 | AMA | Terminating Module Code |
| 20 | AMA | Carrier Access Terminating |
| 21 | AMA | Carrier Access Originating |
| 22 | AMA | Long Duration Call |
| 23 | AMA | WATS |
| 24 | AMA | PSDS |
| 25 | AMA | Circuit Seizure/Release |
| 900–999 | AMA | Reserved for BOC Use |
| 70 | ISDN | Core Module |
| 71 | ISDN | Abbreviated Module |
| 72 | ISDN | Daily Aggregated Service Event |
| 73 | ISDN | Basic Business Group |
| 74 | ISDN | EKTS Capabilities |
| 75 | ISDN | Call Pickup |
| 76 | ISDN | Terminating Access Service |
| 77 | ISDN | Terminating User Service |
| 78 | ISDN | Calling Number Identification |
| 79 | ISDN | Early Cut Through |
| 101 | MDR | Digits Dialed |
| 102 | MDR | Authorization Code |
| 103 | MDR | Account Code |
| 105 | MDR | Message Detail Recording |
| 106 | MDR | Facility Identification |
| 107 | MDR | Business Features |

TABLE 7(c)
Ameritech Call Detail Recording System MDR format

| Record Position | Description/Value |
|---|---|
| | Tie Trunk Calls |
| 1 | "A" |
| 2–7 | Date of Call |
| 8 | Space |
| 9–13 | Time of Call |
| 14 | Space |
| 15–22 | Duration of Call |
| 23 | Space |
| 24–26 | Originating NPA |
| 27–29 | Originating NXX |
| 30–33 | Originating Line Number |
| 34 | Space |
| 35–37 | Call Code |
| 38 | Space |
| 39 | Call Type |
| 40 | Dial Indicator |
| 41 | Space |
| 42–65 | Dialed Digits |
| 66 | Space |
| 67–80 | Account/CDAR Codes |
| 81 | ASCII Carriage Return |
| 82 | ASCII Line Feed |
| | Non-Tie Trunk Calls |
| 1 | "A" |
| 2–7 | Date of Call |
| 8 | Space |
| 9–13 | Time of Call |
| 14 | Space |
| 15–22 | Duration of Call |
| 23 | Space |
| 24–26 | Originating NPA |
| 27–29 | Originating NXX |
| 30–33 | Originating Line Number |
| 34 | Space |
| 35–37 | Call Code |
| 38 | Space |
| 39 | Call Type |
| 40 | Dial Indicator |
| 41 | WATS Band |
| 42 | Space |
| 43–45 | Terminating NPA |
| 46–48 | Terminating Nxx |
| 49–52 | Terminating Line Number |
| 53–56 | Terminating Number Expansion |
| 57 | Space |
| 58–60 | Carrier Identification |
| 61–66 | Spaces |
| 67–80 | Account/CDAR Codes |
| 81 | ASCII Carriage Return |
| 82 | ASCII Line Feed |

TABLE 7(d)
5ESS Switch MDR Formats

| Bytes | Description |
|---|---|
| | Incoming Private |
| 4 | Switch Client |
| 2 | Business Customer ID |
| 1 | Feature Identification |
| 1 | Length |
| 1 | Message Type |

TABLE 7(d)-continued

5ESS Switch MDR Formats

| Bytes | Description |
|---|---|
| 1 | Call Event Code |
| 1 | Feature Interaction Code |
| 1 | ARS Pattern Group |
| 1 | Facility Restriction Level |
| 1 | Answer Indicator |
| 1 | Incoming Facility Type |
| 1 | Outgoing Facility Type |
| 2 | Incoming Facility Group No. |
| 2 | Incoming Facility Group Member Number |
| 2 | Outgoing Facility Group No. |
| 2 | Outgoing Facility Group Member Number |
| 4 | Answer Time |
| 4 | End of Dialing Time |
| 2 | Date of Call |
| 16 | Called Number |
| 2 | Fill Field |
| 1 | Information Transfer Mode |
| 1 | Fill Field |
| | Originating Private |
| 4 | Switch Client |
| 2 | Business Customer ID |
| 1 | Feature Identification |
| 1 | Length |
| 1 | Message Type |
| 1 | Call Event Code |
| 1 | Feature Interaction Code |
| 1 | ARS Pattern Group |
| 1 | Facility Restriction Level |
| 1 | Answer Indicator |
| 1 | Incoming Facility Type |
| 1 | Outgoing Facility Type |
| 2 | Incoming Facility Group No. |
| 2 | Incoming Facility Group Member Number |
| 2 | Outgoing Facility Group No. |
| 2 | Outgoing Facility Group Member Number |
| 4 | Elapsed Time |
| 4 | Answer Time |
| 4 | Disconnect Time |
| 4 | End of Dialing Time |
| 4 | End of Outpulsing Time |
| 2 | Date of Call |
| 10 | Calling Number |
| 16 | Called Number |
| 15 | Authorization Code |
| 15 | Account Code |
| 5 | Access Code |
| 1 | Fill Field |
| 1 | Information Transfer Mode |
| | Public |
| 4 | Switch Client |
| 2 | Business Customer ID |
| 1 | Feature Identification |
| 1 | Length |
| 1 | Message Type |
| 1 | Call Event Code |
| 1 | Feature Interaction Code |
| 1 | ARS Pattern Group |
| 1 | Facility Restriction Level |
| 1 | Answer Indicator |
| 1 | Incoming Facility Type |
| 1 | Fill Field |
| 2 | Incoming Facility Group No. |
| 2 | Incoming Facility Group Member Number |
| 4 | Elapsed Time |
| 4 | Answer Time |
| 4 | Disconnect Time |
| 4 | End of Dialing Time |
| 4 | End of Outpulsing Time |
| 2 | Date of Call |
| 10 | Calling Number |
| 16 | Called Number |
| 15 | Authorization Code |
| 15 | Account Code |
| 5 | Access Code |
| 3 | Carrier Identification |
| 2 | Fill Field |
| 1 | Information Transfer Mode |
| 1 | Fill Field |

TABLE 7(e)

DMS-100 Switch MDR Format

| Bytes | Description |
|---|---|
| | Basic Record |
| 2 | Record Code |
| 3 | Customer Group Number |
| 1 | Origination Type |
| 12 | Origination ID |
| 2 | Info Digits 1 & 2 |
| 1 | Subgroup |
| 1 | Termination Type |
| 12 | Termination ID |
| 1 | Route Info Digit |
| 3 | Date |
| 6 | Time |
| 6 | Elapsed Time |
| 1 | Originating Feature Code |
| 1 | Terminating Feature Code |
| 12 | Called Digits (Record type D1, D2, D3, D4) |
| 12 | Called Digits (Record type D3, D4) |
| | Extension Record: Digits as Outpulsed |
| 2 | Record Code (=D5) |
| 23 | Digits Outpulsed |
| 1 | Digits Missing |
| | Extension Record: Account or Authorization Codes |
| 2 | Record Code (=D6) |
| 1 | Record Type |
| 1 | Spare |
| 14 | Account or Authorization Code |

The system uses an asynchronous communications protocol for transferring files from one computer to another. Kermit is an appropriate protocol; others would include, for example, Z-modem. It checks for errors and re-transmits erroneous packets. Several kinds of file transfers, for example, transfers to the customer's manager using the ACDRS protocol and transfers of statistics to the administrator processor, are done using portions of the Kermit file transfer protocol developed and distributed by the Columbia University Center for Computing Activities. Kermit is used in a polling environment where a requesting computer running the client version of the Kermit protocol retrieves files from another computer running the server version of the protocol. In the Kermit transfer environment as it is used in the message processor, the client first requests a file with a known name (the pclist file). This file contains a list of filenames for the files to be transferred during the session. The list of message processor files to be transferred to a client is managed by the Kermit File Builder process.

Figure 13:
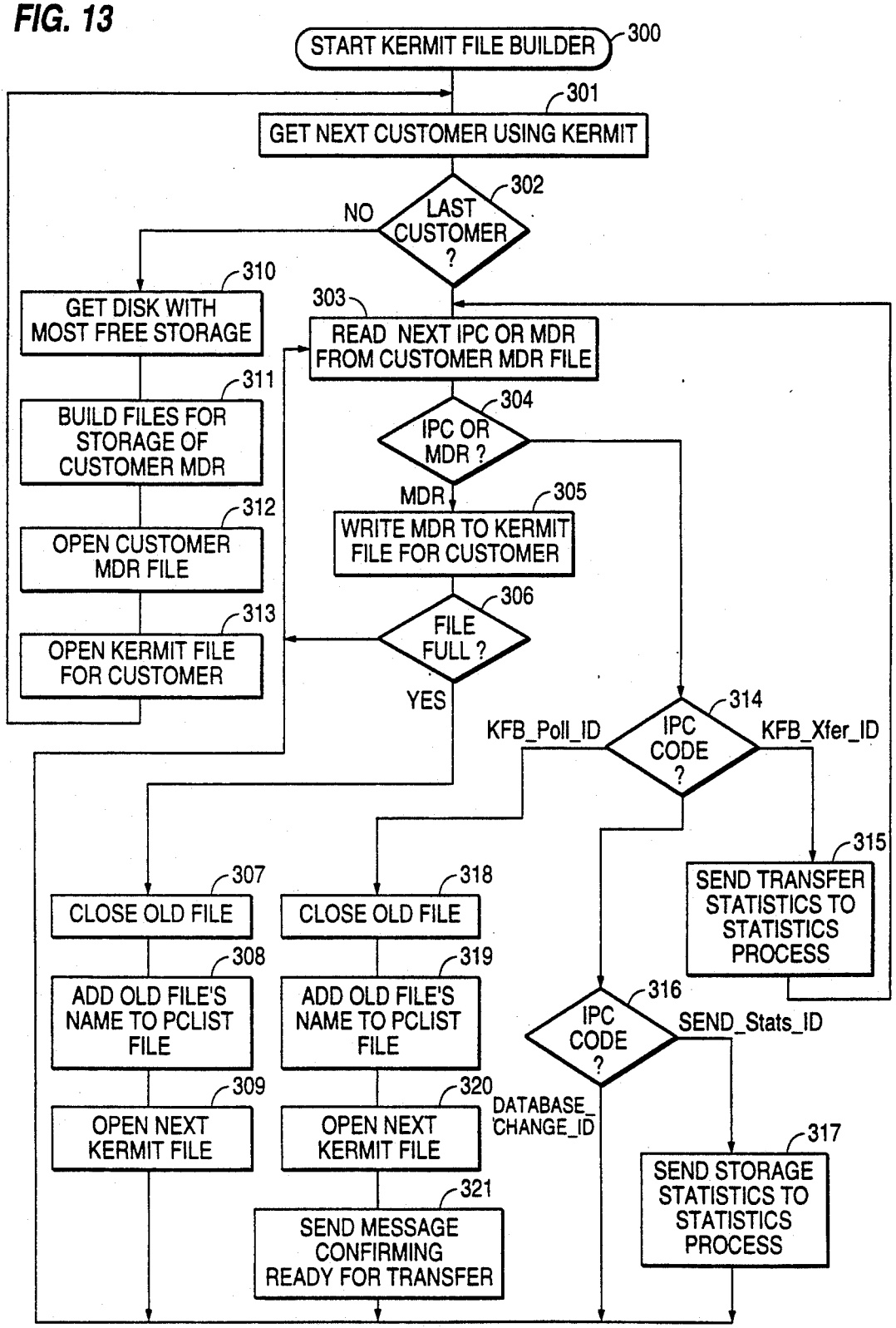
FIG. 13 is a flow chart of the Kermit file builder.

The logic of the Kermit File Builder process is described in FIG. 13. The process first initializes by reading through a Customer Configuration table extracting a record for each Customer using Kermit, at step 301. If this is not the last customer, as determined in step 302, it then finds the disk with the largest amount of free disk storage at step 310 and builds a list of files for the customer at step 311. It then opens the MDR File for the customer at step 312. (This is the file into which the Switch Interface will simultaneously write MDR). It then opens the next Kermit file for the customer at step 313. (This is the file into which the Kermit File Builder process will write MDR). If all customers have been processed, as determined in step 302, the Kermit File Builder will then process IPC messages and MDR.

The Kermit File Builder reads either an MDR from a MDR File, or an Interprocess communications (IPC) message at step 303. If an MDR was read, as determined in step 304, it writes the MDR to the customer's Kermit file at step 305 and checks to see if that record filled the file at step 306. If not, the Kermit File Builder loops back to get the next MDR or IPC message at step 303. If the file was full, it closes that file at step 307 and adds the name of that file to the pclist file of files ready for transmission to the customer. It then opens the next Kermit file at step 309 and loops for the next MDR or IPC message at step 303.

If an IPC message was received, the predefined message code in the IPC is tested at steps 314, 316. If the code was a predefined code KFB_Xfer_ID, the Kermit transfer of files to the customer's manager has finished. The Kermit File Builder then sends statistics on the transfer to the Statistics Process at step 315. If the code was a predefined code Send_Stats_ID, the Kermit File Builder sends storage statistics on disk storage for each customer as well as the total to the Statistics Process at step 317. If the IPC Code is Database-Change-ID, control returns to step 303.

In the case of transferring files to a customer's manager, the manager 6 calls a message processor communications port and logs on using a userid and password assigned by the telephone company through the administrator processor. A script in a .login file, which is automatically run when a Kermit user logs on, starts by sending a polling message, for example, a KFB_Poll_ID IPC message, to the Kermit File Builder to request preparation of a pclist file for that customer. Thus, if at step 314 a Kermit File Builder Poll I.D. message is detected, the Kermit File Builder closes the file it is currently writing for that customer at step 318 and places its name into the pclist file at step 319 and wakes up the shell process running the requesting .login script at step 321. The .login script next invokes the Kermit program (in server mode) to transfer files to the customer and waits for Kermit to exit. The manager 6 first retrieves the pclist file and then retrieves each of the files named in it. When the last file has been transferred, the Kermit client signals completion and terminates the communication session. The Kermit server on the message processor then exits which wakes up a shell process running the .login script. The login script then sends an IPC message to the Kermit File Builder which causes the Kermit File Builder to read an xlist file to determine which files have been transferred and send the statistics to the Statistics Process as previously discussed. The .login script then logs out which frees the communication port for the next transfer.

If the files are to be sent to the collector 7 instead of directly to the manager, the process is similar to the manager calling the message processor.

Several processes are used to provide remote, centralized operations, administration and maintenance for the message processors operated by a telephone company. This is especially significant to telephone companies, as it enables them to run their network with a much smaller nun%her of personnel. The major areas that can be handled remotely are surveillance (i.e. the reporting of problems with the message processor or its interfaces), administration of message processor databases, updating the message processor software, and the analysis of data reporting the utilization of various message processor resources. These are handled both through message processor application software processes (e.g., the Alarm Interface process and the Statistics Process) and by utilities driven by the administrator processor over the communications line (e.g., the process and the message processor Data Entry Process). Generally, these remote activities are done by transferring a file (with a known filename) to the message processor or administrator processor where it is processed by the software.

The Alarm Interface process A14 is responsible for receiving alarm information from the IPC message queue and writing it to an Alarm File in the format shown in Table 2. The Alarm Interface process then uses a communications port to dial an administrator processor's Alarm Port and transfers the Alarm File to the administrator processor where it is entered into a database and telephone company personnel, for example, a System Administrator, are notified. Alarms should be always sent though the administrator processor's Alarm Port even if there is a dedicated connection to the administrator processor for transferring table data and statistics. The administrator processor's AlarmPort 701 has an Alarm Requestor 703 for requesting and receiving alarms from the message processor and an alarm transmitter 705 for transmitting the alarms to database and telephone company personnel.

TABLE 2

| Alarm File Format | |
|---|---|
| Field Name | Description |
| err_er_index | MP identifier |
| err_date_time | time of error occ. |
| err_pid | process id of proc with error |
| err_proc_type | type of errored process |
| err_severity | error severity |
| err_code | error id code |
| err_mdrs | no. unprocessed MDRs |
| err_desc | desc of error from MP |
| err_type | alarm (A) or error msg (E) |

The Statistics Process A6 is responsible for requesting and collecting statistics from the processes that communicate with the switch and the customers. The Statistics Process is started by the Initialization Process and then runs on a scheduled basis. When a collection period ends, the Statistics Process sends a message to the other processes to signal them to send their current statistics and begin keeping statistics for the next collection period. The statistics are written to one of three statistics files as they are received from the IPC message queue.

A message processor Statistics File contains statistics on the overall message processor and the switch interface. Most of this information is collected by the Switch Interface process as it processes MDRs received from the switch and is counted at steps 110, 112, 114 into cells of a data structure that is sent to the Statistics Process when requested at the end of each statistics collection period. Each record in the file as shown in Table 3(b) below is copy of that structure.

A Customer Transfer Statistics File contains statistical information on MDRs transferred to a customer during a polling session or during a statistics collection period. The format of the information in the Customer Transfer Statistics file is shown in Table 3(a) below. This information is collected by the Kermit File Builder and sent to the Statistics Process upon request. Certain aperiodic processes (i.e. the Scheduled Customer Premises Interface and Polled Customer Premises Interface processes) will send statistics without being prompted when they have completed a transmission session. The Statistics Process consolidates information from these sources and prepares them for transmission to the administrator processor. The administrator processor has a statistics requestor 707 for requesting and receiving statistics from the message processor.

TABLE 3(a)

| Customer Transfer Statistics File Format | |
|---|---|
| A Field | B Contents |
| cts_cust_index | Identifies the Customer |
| cts_start | Time the transfer started |
| cts_end | Time the transfer finished |
| cts_tran_type | Type of MDR transfer |
| cts_mdr_sent | Total MDR's sent to the customer |

TABLE 3(b)

| MP Statistics File Format | |
|---|---|
| A Field | B Contents |
| mps_start | start time for transaction period |
| mps_end | stop time for transaction period |
| mps_sw_trans | total MDR's read from switch |
| mps_err_cnt | number of errored MDR's read from switch |
| mps_filter-count | total MDR's ignored |
| mps_err_time | time last errored MDR was read |
| mps_bad_cust | number of MDR's with a bad customer id |
| mps_bad_size | number of MDR's with wrong length |
| mps_bad_fld | number of MDR's with bad data fields |
| mps_mdr_stor | total MDR's stored in files |
| mps_mdr_size | MDR disk usage |
| mps_mp_stat | MP operational status |
| mps_overflow_count | total MDR's stored in the Overflow MDR File |

TABLE 3(c)

| Customer Storage Statistics File Format | |
|---|---|
| A Field | B Contents |
| css_cust_index | identifies the customer |
| css_start_line | start time for statistics period |
| css_end-time | stop time for statistics period |
| css_sw_mdrs | total MDR's read from switch for customer |
| css_dks_mdrs | total MDR's written to disk for customer |
| css_max-fsize | maximum Cust. MDR File size reached |

Figure 18:
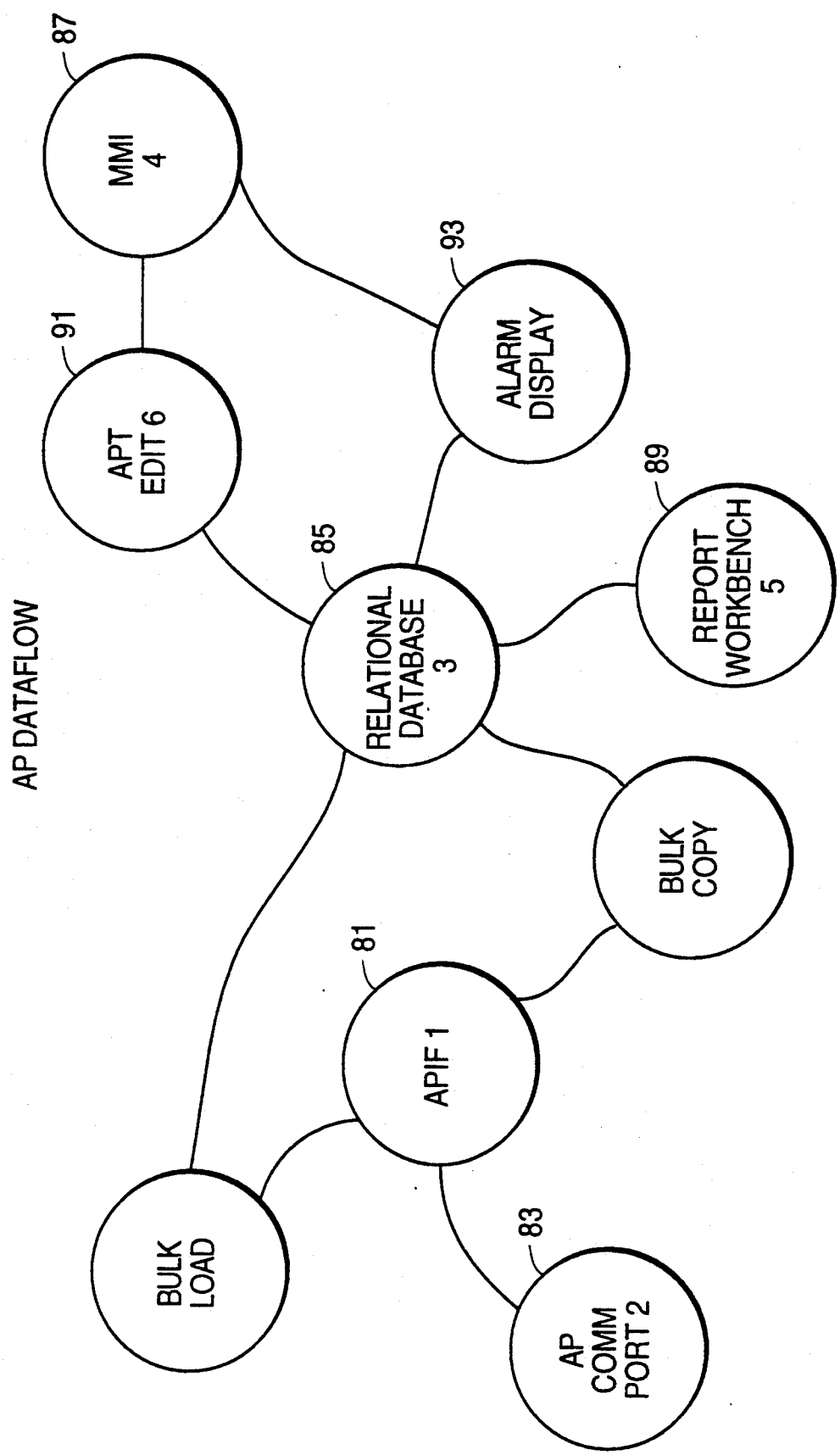
FIG. 18 illustrates data flow in an administrator processor.
Figure 19:
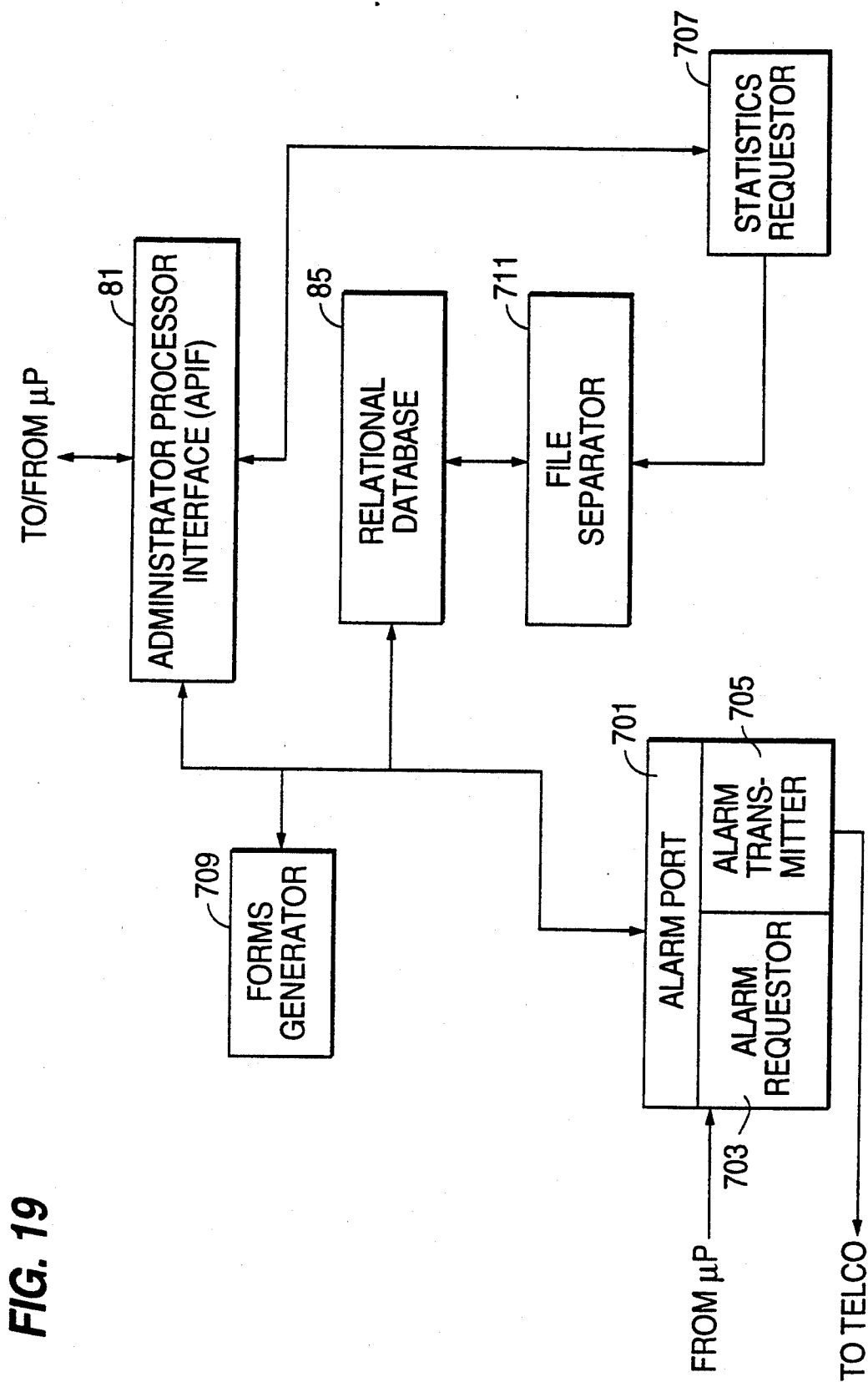
FIG. 19 is a block diagram of an administrator processor.
Figure 20:
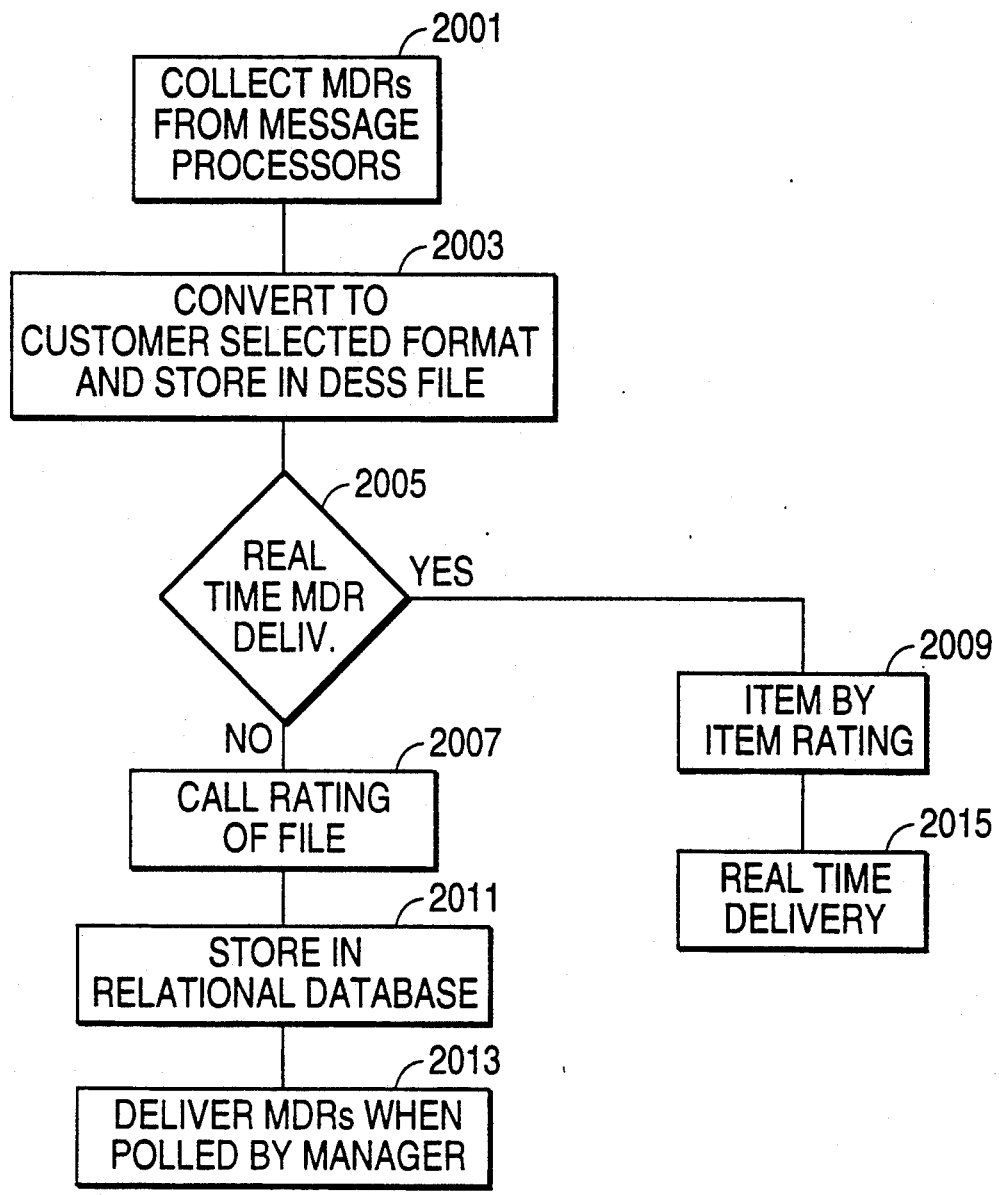
FIG. 20 illustrates collecting and delivering MDRs.

When the administrator processor 8, as shown in FIGS. 18 and 19, needs to update the message processor's tables, a communicator, such as an Administrator Processor Interface (APIF) 81 (the administrator processor process responsible for managing message processor communications) uses an administrator processor communications port 83 to dial the message processor communications port and log on using an administrative userid. When OS-9 accepts the logon, it runs the shell command interpreter. The APIF then uses the shell to execute a sequence of shell commands to do the update. The message processor Data Loader (not shown) is invoked to add information to message processor tables. The message processor Data Loader process reads ASCII records from its standard input (which are sent by the APIF) and loads them into the message processor table or data file as specified by the APIF. When it reaches the end of the file, the message processor Data Loader will print a success message on its standard output (which will be read by the APIF) and exit. The APIF then invokes the Database Update Notifier process which sends a database_change IPC message to each process using the updated database. This would be received by the Switch Interface process and handled by repeating the portion of the Switch Interface process' initialization beginning at step 103 as described above.

The administrator processor 8 is a centrally located system used to create and maintain system configuration and user profile information for the central-office located message processors. The administrator processor's software may advantageously use the UNIX operating system which runs on various commercially available workstations. The preferred hardware embodiment is the Sun Microsystems, Inc. SPARCstation IPC workstation. This is a RISC based workstation with a 16 inch color monitor, 12 MByte RAM and a 207 Mbyte internal SCSI disk drive. As the reader will recognize, the administrator processor software could run on other hardware.

The administrator processor software preferably runs under a version of the UNIX operating system available from Sun Micro Systems, SunOS 4.1.1. UNIX is a portable multiuser operating system originally developed by AT&T Bell Labs. A relational database 85 is used to store data on the configuration of the message processors and the customers they serve. This database is also used to hold the statistical data retrieved from the message processors. The operating system under which the system runs should permit the use of a relational database system which has a number of advantages including a powerful, flexible high level language for producing reports and a user friendly MMI 87. The database program used in the preferred embodiment of the administrator processor is SYBASE with its associated Report Workbench 89, and APT-EDIT 91 forms and menus tool although the reader will recognize other database systems could be used. APT-EDIT 91 functions as a forms generator shown in FIG. 19 as Forms Generator 709.

The processes within the administrator processor are described in Table 4 below. Most of the software of the administrator processor is driven by the user interface which is advantageously designed as a series of forms, produced by forms generator 709 that the user fills in. These forms provide selectors allowing the user to select, for example, a format from a plurality of selected formats or an MDR format from a plurality of switch or customer premise formats.

TABLE 4

| Administrator Processor Software Modules | |
|---|---|
| Module Name | Description |
| Admin_proc | The main AP process. The user interface will be a part of this section along with additional scripts to schedule reports, view logs, handle report output, etc. |
| Reports | The various reports required for this system will be created in the Report_Workbench, stored and executed from the Report_Scheduler process. |
| Report-Scheduler | This process accesses the database to determine which reports have recently been run and need to have their scheduling data updated. Note that the initial cron entry for a scheduled report will be taken care of by the report scheduling form. |
| Transaction_Scheduler | This process will access the appropriate MP at the times given in the transfer schedule table to accept transaction data and load it into the database. |
| Time_Keeper | This process will send messages to the |

TABLE 4-continued

Administrator Processor Software Modules

| Module Name | Description |
|---|---|
| | Transaction_Scheduler to cause it to check for scheduled operations. |
| Transaction_Purger | This process will execute on a daily basis to remove the transaction records that have exceeded their allowed time in the database. |
| APIF | This process will communicate with designated MPs to retrieve statistics, load software, and load/unload MP tables. Alarms from MPs will also go through this process. |
| Alarm_Display | This process produces a real time notification of alarm messages on the screen if required. |

Table 5, below, shows the hierarchy of forms in the administrator processor. At a highest level, a main window is displayed when a user logs on and the application is first accessed. The main window shows a choice of four options and the user selects one depending on the task to be performed. As three levels of additional security are provided through the database system, the user is prevented from seeing fields or forms he is not authorized to use. Any appropriate number of levels of security can be employed.

TABLE 5

AP Forms Hierarchy

| Option | Form | Selection | Sec Windows | Action | Description |
|---|---|---|---|---|---|
| Table Maintenance | System Access | Customer Form | | Update DB Customer | Defines MP and Customers for a particular company |
| | | Customer Transfer Schedule Form | | Update DB Transfer_Schedule | Defines message transfer schedules for customers polled by the MP |
| | | MP Company Form | | Update DB Customer | Stores information on a particular company |
| | | AP User Form | | Update DB AP User | Defines the users that can access the AP including login ID, password and permissions |
| | System Configuration | AP Destinations Form | | Update DB AP Destinations | Defines destinations for sending reports |
| | | AP Parameters Form | | Update DB AP Table | Defines AP parameters such as the number of days to store historical data, dedicated alarm port, dial-up number, baud rate |
| | | AP Ports Form | | Update DB AP Ports | Defines each port and its parameters for communicating with MPs |
| | | MP Parameters | | Update DB MP Table | Defines MP specific parameters (e.g. MP name, loaction, message storage capacity) |
| | | MP Switch Interface | | Update DB MP Ports | Defines MP port used to connect to switch |
| | | MP-AP Interface | | Update DB | Defines MP port used to connect to AP |
| | | MP Alarm Interface | | Update DB | Defines MP port used for delivery of alarms |
| | | MP Ports | | Update DB | Defines MP ports used to deliver MDR |
| Transaction Processing | Process Call Information Form | Reprocess Overflow MDR | | Appl Function | Requests reprocessing of overflowed MDR on a specific MP |
| | | Delete Overflow MDRs | | Appl Function | Requests the deletion of overflowed MDR on a specific MP |
| | | Reprocess Error MDR | | Appl Function | Requests reprocessing of error MDR on a specific MP |
| | | Reprocess Error MDR | | Appl Function | Requests the deletion of error MDR on a specific MP |
| | Immediate MP Connection | | | Appl Function | Requests immediate connection to a MP to update tables. |
| | View Error Records | | | Appl Function | View errored MDR sent to AP |
| Reports | Table Reports | System Access Reports | Customer Report | DB Report | Report on all customers |
| | | | Customer Transfer Schedule Report | DB Report | Reports the transfer schedule for each customer from every MP |
| | | | Company Report | DB Report | Report on all companies served by MPs |
| | | | AP User Report | | Reports on AP Users with userid and permissions |
| | | System Configuration Reports | AP Destinations Report | DB Report | Reports on AP report destinations |
| | | | AP Parameters Report | DB Report | Report on AP Parameters |
| | | | AP Ports Report | DB Report | Lists AP ports and their configurations |
| | | | MP Parameters Report | DB Report | Reports on MP parameters (MP name, Location, disk capacity, switch type and format, thresholds |
| | | | MP Ports Report | DB Report | Reports on MP parameters (MP name, Location, disk capacity, switch type and format, thresholds |
| | | MP Audit Report | | Application Report | Report on discrepancies between AP |

TABLE 5-continued

AP Forms Hierarchy

| Option | Form | Selection | Sec Windows | Action | Description |
|---|---|---|---|---|---|
| | | | | | database and tables stored in MPs. |
| | Transaction Reports | Transaction Detail Report | | DB Report | Same as Transaction Summary Report but also shows length of each transaction |
| | | Transaction Summary Report | | DB Report | Summarizes the number of records transferred and stored by MP and customer for a date range. |
| | | Message Throughput Report | | DB Report | Reports statistics on transfers between switches and MPs as well as between MPs and customer premises. |
| | | Disk Capacity Detail Report | | DB Report | Reports capacity and storage of MDRs for companies and MPs. |
| | | Disk Capacity Summary Report | | DB Report | Same as Call Record Capacity Detail Report except summarized by MP. |
| | Error Reports | System Alarm Report | | DB Report | Reports alarms that have occurred for specific MPs and time ranges. |
| | | MDR Error Report | | DB Report | Reports errors that would prevent processing of MDR by specific MPs. |
| System Maintenance | Report Scheduler | List Schedule Report | | DB Report | Lists currently scheduled reports for a given use |
| | View Log Files | | | Appl Function | View application log files for troubleshooting purposes |
| | DB Backup or Recovery | Backup AP User Database | | Database Function | Backs up database of user information and system tables. |
| | | Backup Application Database | | Database Function | Backs up AP application relations |
| | | Backup Transaction Log | | Database Function | Backs up just SYBASE transaction logs |
| | | Clear Transaction Log | | Database Function | Clears out SYBASE transaction logs. |
| | | Restore Database | | Database Function | Instructions on how to restore the AP application database. |
| | | Restore Transaction Log | | Database Function | Instructions on how to reprocess transactions to bring database up to date. |

If either administrator processor data or message processor data are to be changed, the Table Maintenance options is selected. Each of the forms was created using a commercially available edit tool known as the SYBASE APT-EDIT tool. When the user needs to enter data into a field, help windows are displayed where appropriate to allow selection from a list of valid values. If not, input is validated by:

Testing against values in a relation
Testing against other values in the form to ensure consistency
Testing against a range of valid values
Testing against a set of discrete values (e.g. 'Y', 'N', or 1, 4, 5)
Testing against a pattern of allowed input.

When the user completes entering (or updating) data on a database update form, the data is entered into the appropriate relation in the database. In Table 5 below, the Action column specifies the name of the main relation (in italics) that is to be updated in any of the Table Maintenance option forms. Table 6, below shows the administrator processor database relations.

TABLE 6

AP Database Relations

| Field Name | Type/Length | Description |
|---|---|---|
| | | MP Table Relation |
| | | This table is the primary source of information on an MP. |
| mp_index | int | MP index (1-500) |
| mp_name | char(20) | name of the MP |
| mp_loc | char(20) | MP location |
| mp_fname | char(10) | MP contact first name |
| mp_lname | char(20) | MP contact last name |
| mp_phone | char(20) | MP contact phone |

TABLE 6-continued

AP Database Relations

| Field Name | Type/Length | Description |
|---|---|---|
| mp_timezone | int | MP timezone - like Unix |
| mp_dst | char(1) | Daylight Savings Time used |
| mp_bill_day | int | Reserved for future use |
| mp_sw_fmt | char(8) | MP switch format |
| mp_sw_prot | char(8) | MP switch protocol |
| mp_upd | int | AP updates MP - day bit map |
| mp_up_time | int | AP updates MP - hour |
| mp_mdr_cap | int | MDR cap in MB |
| mp_ovfl_cap | int | overflow capacity in MB |
| mp_err_cap | int | error file capacity in MB |
| mp_err_thresh | int | error threshold count |
| mp_err_pe | int | threshold count period (minutes) |
| mp_ap_con_typ | char(1) | AP connection type (D/P) |
| mp_alarm_prefix | char(30) | prefix for alarm calls |
| | | Message Transaction Relation |
| | | This relation stores statistics on transfers from the MP to Manager |
| cts_mp_index | int | MP identifier (1-500) |
| cts_cust_index | int | cust id (1-500) |
| cts_start | datetime | start stats period |
| cts_end | datetime | end stats period |
| cts_tran_type | char(1) | transfer type - D,S or P |
| cts_mdrs_sent | int | MDR sent to CP |
| | | Customer Storage Relation |
| | | This relation stores statistics relating to MDR storage for a customer during a statistics collection period. |
| css_mp_index | int | MP identifier (1-500) |
| css_cust_index | int | cust id (1-500) |
| css_start | datetime | start stats period |
| css_end | datetime | end stats period |
| css_sw_mdrs | int | MDRs read for cust |
| css_dsk_mdrs | int | MDRs written to disk |
| css_max_fsize | int | max MDR file size for cust |
| | | MP Statistics Relation |
| | | This relation stores statistics on the overall MP. |

TABLE 6-continued

AP Database Relations

| Field Name | Type/Length | Description |
|---|---|---|
| mps_mp_index | int | MP identifier |
| mps_start | datetime | start of trans period |
| mps_end | datetime | end of trans period |
| mps_sw_trans | int | MDR read from switch |
| mps_err_cnt | int | errored MDRs read in |
| mps_filter_count | int | records filtered out |
| mps_err_time | datetime | time of last errored MDR |
| mps_bad_cust | int | no. MDRs with bad cust id |
| mps_bad_size | int | no. MDRs with bad length |
| mps_bad_fld | int | no. MDRs with bad data flds |
| mps_mdr_stor | int | tot MDRs stored in files |
| mps_mdr_size | int | MDR disk usage |
| mps_mp_stat | int | MP status |
| mps_overflow_count | int | number recs in overflow area |

System Errors Relation
This relation stores information on error messages.

| Field Name | Type/Length | Description |
|---|---|---|
| err_mp_index | int | MP identifier |
| err_date_time | datetime | time of error occ. |
| err_pid | int | process id of proc with error |
| err_proc_type | int | type of errored process |
| err_severity | int | error severity |
| err_code | int | error id code |
| err_mdrs | int | no. unprocessed MDRs |
| err_desc | char(255) | desc of error from MP |
| err_type | char(1) | alarm (A) or error msg (E) |

Customer Relation
This relation stores information on a customer.

| Field Name | Type/Length | Description |
|---|---|---|
| cust_index | int | cust in MP (1-500) |
| cust_comp_index | int | cust's company |
| cust_bci | char(20) | business cust id (MDR ID) |
| cust_bci_2 | char(20) | second alphanumeric bci field |
| cust_name | char(20) | customer name |
| cust_fname | char(10) | cust contact first name |
| cust_lname | char(20) | cust contact last name |
| cust_phone | char(20) | contact phone number |
| cust_mp_index | int | MP used by customer (1-500) |
| cust_dat_tran | char(1) | data transfer method (P,D,S) |
| cust_port_grp | char(20) | grp used to contact CP |
| cust_tran_fmt | char(10) | transfer format |
| cust_port_name | char(20) | NOT USED -name of port to use |
| cust_protocol | char(8) | transfer protocol |
| cust_cp_phone | char(30) | CP phone to connect to CA prdt |
| cust_cp_user | char(20) | CP login |
| cust_passwd | char(20) | CP login password |
| cust_parity | char(1) | CP parity |
| cust_baud | int | CP baud rate |
| cust_stop | int | CP stop bits |
| cust_data | int | CP data bits |
| cust_flow | char(1) | CP flow control flag (Y/N) |
| cust_mp_enabled | char(1) | MP enabled flag for cust |
| cust_mp_ovrfl | char(1) | MP handles overflow flag |
| cust_mp_disk | int | MP disk alloc for cust MDRs |
| cust_oth_disk | int | NOT USED -MP alloc for other files |

Transfer Schedule Relation
This relation stores the schedule for transfers to the customer's Manager.

| Field Name | Type/Length | Description |
|---|---|---|
| trns_index | int | unique transaction id number |
| trns_cust_index | int | customer index (1-500) |
| trns_mp_index | int | MP index (1-500) |
| trns_day | int | day bit map |
| trns_time | int | hour of transfer |

After changing message processor data, if the updated tables are to be sent to message processors affected by the change, the user can either wait until the next scheduled transfer of statistics or can cause the update to be transmitted immediately by using the Immediate Message Processor Connection form. This causes activation of the APIF process to collect data and transfer it to the indicated message processors.

The APIF uses a file transfer protocol, such as Kermit to transfer data stored in ASCII files, for example, the message processor table updates to the message processor. The APIF uses a commercially available command language tool, for example, Tool Command Language and EXPECT, created by the National Institute of Standards and Technology to communicate with a shell process on the message processor to invoke various programs, such as, the message processor Data Loader that use the data to update the message processor.

When it is necessary to audit the message processor to ensure that its tables match the data in the administrator processor's database, the APIF calls the message processor, logs on and uses the message processor data unloader to unload the data from message processor tables and stores it on the message processor's disk in ASCII format. When the message processor data unloader exits, the APIF uses the file transfer protocol, such as Kermit to retrieve the file. Once the file has been retrieved, the administrator processor compares it against an message processor configuration file prepared from the current database.

The administrator processor will periodically poll message processors for example, using statistics requestor 707 to retrieve transaction statistics data at times based on the schedule in the Transfer Schedule relation. When the time occurs, a process which schedules periodically run processes or programs, such as a UNIX cron process, invokes the APIF process specifying which message processor is to be polled. The APIF will call the message processor, logon and process as follows on the message processor:

1) Use the message processor Data Unloader program to get all transaction statistics records for each customer x (where x is a customer name from a Customer relation in the administrator processor database) and place the records into a results file. This is repeated for all customers on the message processor.
2) Retrieve the results file from the message processor using Kermit.
3) Logoff and disconnect the communications line.

Once the file is on the administrator processor, it is processed as follows:

1) The file is separated into three parts in file separator 711. The transaction records (from the MP's Customer Transfer Statistics file as shown in Table 3(a)), an overall message processor statistics record (from the message processor statistics file as shown in Table 3(b)) and a set of customer MDR storage statistics (from the Customer Storage Statistics file as shown in Table 3(c)).
2) The message processor statistics records are inserted into the message processor statistics relation.
3) The Customer Transfer Statistics and Customer Storage Statistics records are inserted into the Message Transaction Relation and the Customer Storage relation respectively, using the SYBASE bulk load utility.
4) After processing is complete, the original data file and any temporary files are removed from the administrator processor.

The statistics will subsequently be used in the reports produced by the Transaction Reports form. The Transaction Reports accessed from the Reports menu are predefined reports. They can be produced by using a commercially available database system, for example, by using the SYBASE REPORT WORKBENCH using SQL commands. For example, a Transaction Summary Report is produced using the following SQL statement:

```
SELECT mp_name, cust_name, cts_date, cts_
    tran_type,   css_max_fsize,   cts_mdrs_sent,
    cts_mdrs_sent
FROM message_transaction_relation, customer_s-
    torage_relation,   MP_table_relation,   cus-
    tomer_relation
WHERE cts_mp_index=mp_index AND cts_m-
    p_index=css_mp_index   AND   cts_cust_in-
    dex=cust_index AND cts_cust_index=css_cus-
    t_index AND cts_start> = report start date AND
    cts_start< = report end date
GROUP BY cts_start, cts_mp_index, cts_cust_in-
    dex
```

This uses the MDR storage statistics (in the Customer Storage Relation) with the statistics on MDRs transferred to the customer (in the Message Transaction Relation) for the basic information. The Message Processor Table Relation and Customer Relations are joined with these to produce human readable names for the message processor and customer. The age of transactions of interest is determined by the report *start date* and *report end date* parameters which are taken from the values the user enters in the Transaction Summary Report form. A user my be given authority to create a custom report using SQL, but would not typically be given the ability to modify the standard reports.

Alarm messages are sent to the administrator processor for immediate attention by the System Administrator, transmission to a surveillance Operations System, printing on a dedicated alarm printer and/or logging for later review. Alarms may be generated within the administrator processor or sent from a message processor using a file transfer protocol such as Kermit. The alarm message will be in the Alarm Message File in the format shown in Table 2 and will contain full information about the alarm or alarms, if several have accumulated. This data may be entered into the database in various ways. The information should also be entered into the System Errors Relation. A message, an alert, is then sent to the Alarm Display process 93, for example, as implemented in the Alarm Transmitter 705, so that it alerts the System Administrator to the new alarm. The alert uses a colored alarm icon if the System Administrator is using a graphics workstation or a text message (when the current form is exited) if an ASCII terminal is being used.

The collector typically manages the collection of call detail records from multiple message processors and Customer's PBX SMDR storage devices and store them in a file for each customer. Thus, it separates the MDRs by customer and transmits the records to Customer provided call-accounting systems for costing calls and producing management reports. The collector may process the MDRs itself and send costed MDR and/or the management reports to the customer. The collector advantageously has a Customer relational database with the appropriate information to maintain the operational, administrative, provisioning and billing of collector services as well as a transaction log of all Customer transactions.

The collector should have some or all of the following capabilities:
Collect MDRs from message processors;
Collect SMDR from PBXs or collection devices;
Provide a file storage system for MDR (Data Element Standard Storage File, DESS File);
Provide the ability to search, display and report on MDR in the Data Element Standard Storage File through a secure, flexible report writer;
Support a standard application interface for end user systems and/or manager systems to have access to the DESS file;
Provide a rating application to rate and re-rate MDRs using various rating algorithms and a multiple carrier services;
Provide the ability to rate MDRs in a real time environment to support the hospitality industry; Provide support for other applications to co-reside on the same platform or network and retrieve information from the DESS file;
Provide a secure method to access the collector through dial-up and network logins;
Report and transmit processed data, for example, rated records to users;
Report on consolidated network charges rolled-up according to the customer's organization structure;
Report and transmit traffic data and usage; and
Report and transmit errors and failures with data transfer, call detail collection, user transactions, system hardware, system power and system network, for integration to the telephone company.

The collector is advantageously based on a UNIX workstation. The preferred hardware embodiment is the Sun Microsystems, Inc. SPARCSTATION IPC workstation. (This is a RISC based workstation with a 16 inch color monitor, 8 MByte RAM and a 207 Mbyte internal SCSI disk drive.) The collector software could run on other hardware supporting the UNIX system.

The collector's application software runs under the UNIX operating system. UNIX is a portable multiuser operating system originally developed by AT&T Bell Labs. It is widely available on virtually every type of computer hardware allowing the collector's application software to be readily ported to another hardware platform. It is to be understood that the current invention comprises software running on other hardware platforms.

The collector application software is designed as a set of processes each of which carries out a specific function. It borrows portions of its design from that of the administrator processor including such capabilities as sending MDR to a customer's manager.

In addition, there should be other modules having other capabilities such as the MDR storage unit file (the DESS file) which acts as a server for all INFO MDR requests for call details. The DESS file is also the primary storage of all polled information from message processors, MDR from CPE systems and call records of manager sessions. The stored information is in flat files indexed by Company, Customer Name (Business ID), source location (message processor site) and date. Each file will maintain all of the call records for that day. The start time of the call will determine which day the record is stored in.

All information concerning the customer and the collector system is kept in a relational database called the Collector Customer Database.

We will now describe the steps involved in collecting MDR from a message processor, allocating them to files for each customer and then delivering them to the customer's manager. The collector polls message processors (step 2001) using Kermit and stores the files in the same format used by the message processor (the Bellcore AMA format (BAF) or the Ameritech Call Detail Recording System format (ACDRS) (step 2003). The collector will manage the transaction, initiate the poll and log the transaction statistics, such as number of call records transferred, into a relational database. This transaction information will be available to a flexible report writer for customer billing & statistical reports.

MDRS are rated (or the cost for a call calculated) by a Call Rating process (steps 2007, 2009). It provides analysis of traffic and cost information independent of the reporting structure necessary for Call Accounting. Cost and traffic analysis can be used to optimize carrier service selections and trunk loads for future capital investment. It may also be used to quickly determine unusual calling patterns and report on misuse, abuse or fraud. A call process rating receives DESS file call records, rates them and then stores the rated records in a separate relational database file (step 2011) which is to be used for subsequent analysis and reporting. It supports North American V & H rating, International V & H rating, International Meter Pulse rating and International Code Book rating for calls regardless of their point of origin or termination in the phone network.

The MDRs are delivered when the customer's manager polls the collector (step 2013).

The MDR can also be delivered in real-time and may also be rated prior to delivery to the customer. In this case, the call rating process receives individual call records from the DESS file rather than an entire file (step 2009) prior to rating and then passes each rated record to the real time delivery module (step 2015).

When the customer subscribes to the management reporting service, Management reports are produced. These are produced using the SYBASE flexible report writer with standard report procedures for analysis and/or summary reporting of the rated calls database. The reports are delivered to customer systems, for example General Ledge and Property Management systems through the available communication links. They can also be printed on the collector's printers and mailed to customers.

The collector my also collect statistics for use in producing management reports for the telephone company.

The collector sends reports, alarm messages or provisioning messages to a telephone company Operations Systems. This may advantageously be done using a Bellcore defined protocol carried on the LAN or RJE/SNA links.

The collector may request and receive MDRs from message processor and separately store them by customer.

Also, the collector may request and receive MDRs from MDR capture devices and separately store the MDRs by switch.

The collector can retrieve MDRs from capture devices using various protocols. Normally, collection begins when the collector initiates a poll (although some capture devices may have the capability of calling the collector when the unit reaches a certain storage threshold). The collector supports several models of capture devices 17 (including but not limited to devices manufactured by MOSCOM).

Collection of MDRs begins when the collector calls the remote PCSU. The MDRs are converted into the format selected for the customer before being stored in the DESS file.

The collector supports costing of MDRs and delivery of MDRs to customers.

Managers (or other call accounting systems) may login to the collector using standard ASCII terminals or PC terminal emulators and can retrieve MDRs from the DESS database using the protocol, for example, Kermit.

The collector also supports management report production and management report delivery.

The manager collects MDRs for a single customer from multiple message processors, collectors and simplified MDR capture devices and prepares various management reports such as organization reports to allocate network charges to departments within an organization, traffic and call distribution reports used for network planning, facility reports on all calls terminating-/originating/ transiting a network node, detailed billing reports by extension number of account code, and other user definable reports. MOSCOM's MaxNet and Discovery/1 products can be used as managers. Several other call accounting systems that can be used as managers also exist. In order for them to work with this invention, they merely need accept MDR in any one of the output formats produced by the collector or message processor.

While specific embodiments of the invention have been described and illustrated, it will be clear that variations in the details of the embodiments specifically illustrated and described may be made without departing from the true spirit and scope of the invention as defined in the appended claims.

What is claimed is:

1. A universal MDR data record collection and reporting system for use with Centrex switches on a telephone network, with a message processor comprising:
   (a) a receiver, said receiver receiving an MDR in one of a plurality of MDR formats from a one of a plurality of different central office switches of a telephone network;
   (b) a reformatter, said reformatter reformatting the MDR to one of a plurality of selected formats;
   (c) means for storing the reformatted MDR in an MDR file; and
   (d) a transmitter, said transmitter transmitting the reformatted MDRs from the message processor on a communications link using a communications protocol.

2. The system of claim 1, further comprising a statistics collector collecting and storing statistics from a plurality of different central office switches.

3. The system of claim 1, further comprising storage storing the selected format and the MDR format for a type of switch.

4. The system of claim 1, further comprising an alarm collector collecting and simultaneously storing message processor alarms from a plurality of different central office switches.

5. The system of claim 1, wherein there is at least one MDR file for each customer simultaneously using a plurality of different central office switches on the telephone network.

6. The system of claim 1, further comprising an error detector determining if the MDR is in the format for a central office switch, and an error file storing a plurality of MDRs not in the format for the switch.

7. The system of claim 6, further comprising a reprocessor reprocessing MDRs not in the format for the switch.

8. The system of claim 1, further comprising an administrator processor, including:

(a) a communicator communicating with the message processor using the communications protocol;

(b) a first selector for selecting the selected format from one of a plurality of selected formats;

(c) a second selector selecting the MDR format from one of a plurality of MDR selected switch or customer premise formats;

(d) a first transmitter transmitting the selected format to the message processor; and (e) a second transmitter transmitting the MDR format to the message processor.

9. The system of claim 8, further comprising an alarm requestor requesting and receiving message processor alarms from the message processor.

10. The system of claim 9, further comprising an alarm transmitter transmitting the message processor alarms.

11. The system of claim 8, further comprising a statistics requestor requesting and receiving statistics from the message processor.

12. The system of claim 8, further comprises storage means for storing selected formats for a plurality of customers.

13. The system of claim 8, further comprising a third transmitter for collecting and storing a plurality of administrator processor alarms.

14. The system of claim 13, further comprising circuitry for transmitting the administrator processor alarms.

15. The system of claim 8, further comprising a plurality of message processors and one administrator processor.

16. The system of claim 15, further comprising a non-dedicated link connecting each of a portion of the plurality of message processors to the administrator processor, wherein the portion is periodically polled by the administrator processor.

17. The system of claim 15, further comprising a dedicated link connecting each of a portion of the plurality of message processor to the administrator processor, wherein the portion is polled on a real time basis.

18. The system of claim 8, further comprising a manager, including:
(a) a communicator communicating with the message processors using the communications protocol;
(b) a receiver receiving reformatted MDRs from the message processor; and
(c) storage storing the reformatted MDRs.

19. The system of claim 18, further comprising a collector, including:
(a) a first communicator for communicating with the message processors using the communications protocol;
(b) a receiver receiving reformatted MDRs from the message processor;
(c) a second communicator communicating with the manager;
(d) at least one customer file for each customer;
(e) storage storing the reformatted MDRs in the customer files; and
(f) an allocator allocating and storing the MDRs by switch.

20. A universal method for collecting and reporting MDR data records for use with Centrex switches on a telephone network, comprising the steps of:
(a) receiving an MDR in one of a plurality of MDR formats from a one of a plurality of different central office switches a telephone network;

(b) reformatting the MDR to one of a plurality of selected formats;
(c) storing the reformatted MDR in an MDR file in a message; and
(d) transmitting the reformatted MDRs from the message processor using a communications protocol.

21. The method of claim 20, further comprising collecting and storing statistics from a plurality of different central office switches.

22. The method of claim 20, further comprising storing the selected format and the MDR format for that type of switch.

23. The method of claim 20, further comprising collecting and simultaneously storing message processor alarms from a plurality of different central office switches.

24. The method of claim 20, further comprising simultaneously storing MDRs separately for each customer using a plurality of different central office switches on the telephone network.

25. The method of claim 20, further comprising determining if the MDR is in the format for a central office switch switch, and storing a plurality of MDRs not in the format for the switch.

26. The method of claim 25, further comprising reprocessing MDRs not in the expected format for the switch.

27. The method of claim 20, wherein the receiving step includes simulating an expected receiver for the type of switch.

28. The method of claim 20, further comprising processing in an administrator processor, said administrator processor processing including:
(a) communicating using the communications protocol;
(b) selecting the selected format from one of a plurality of selected formats;
(c) selecting the MDR format from one of a plurality of MDR formats;
(d) transmitting and storing the selected format; and
(e) transmitting and storing the MDR format.

29. The method of claim 28, further comprising requesting and receiving message processor alarms.

30. The method of claim 29, further comprising transmitting the message processor alarms.

31. The method of claim 20, further comprising requesting and receiving statistics.

32. The method of claim 20, further comprising storing selected formats for a plurality of customers.

33. The method of claim 20, further comprising collecting and storing a plurality of administrator processor alarms.

34. The method of claim 33, further comprising transmitting the administrator processor alarms.

35. The method of claim 28, wherein the communicating step is done by the administrator processor periodically polling the message processor.

36. The method of claim 28, wherein the communicating step is done by the administrator processor polling the message processor on a real time basis.

37. The method of claim 28, further comprising:
(a) communicating between a manager and the message processors; and
(b) receiving and storing reformatted MDRs in the manager.

38. The method of claim 36, further comprising:

(a) communicating between a collector and the message processor;
(b) communicating between the collector and the manager;
(c) receiving reformatted MDRs in the collector;
(d) allocating and storing MDRs by customer in the collector; and
(e) allocating and storing MDRs by switch in the collector.

* * * * *